United States Patent [19]

Port et al.

[11] Patent Number: 5,243,596
[45] Date of Patent: Sep. 7, 1993

[54] NETWORK ARCHITECTURE SUITABLE FOR MULTICASTING AND RESOURCE LOCKING

[75] Inventors: Adrian G. Port, Lansdale; Charles D. Spackman, Chester Springs, both of Pa.; Nicholas R. Steele, Nürnberg, Fed. Rep. of Germany; Jonathan R. Wells, Victoria, Australia

[73] Assignee: Fischer & Porter Company, Warminster, Pa.

[21] Appl. No.: 853,551

[22] Filed: Mar. 18, 1992

[51] Int. Cl.$^5$ .................................. H04L 12/56
[52] U.S. Cl. ................................. 370/94.1; 370/60
[58] Field of Search ............ 370/16, 13, 85.13, 85.14, 370/85.1, 60, 60.1, 94.1, 94.2

[56] References Cited

U.S. PATENT DOCUMENTS

| | | | |
|---|---|---|---|
| 3,781,815 | 12/1973 | Boudreau et al. | 340/172.5 |
| 4,396,983 | 8/1983 | Segarra et al. | 364/200 |
| 4,453,247 | 6/1984 | Suzuki et al. | 370/94 |
| 4,475,192 | 10/1984 | Fernow et al. | 370/94 |
| 4,500,987 | 2/1985 | Hasegawa | 370/60 |
| 4,503,533 | 3/1985 | Tobagi et al. | 370/85 |
| 4,558,428 | 12/1985 | Matsumura et al. | 364/900 |
| 4,566,098 | 1/1986 | Gammage et al. | 370/89 |
| 4,593,280 | 6/1986 | Grow | 340/825.05 |
| 4,597,078 | 6/1986 | Kempf | 370/94 |
| 4,644,470 | 2/1987 | Feigenbaum et al. | 364/200 |
| 4,709,364 | 11/1987 | Hasegawa et al. | 370/85 |
| 4,740,954 | 4/1988 | Cotton et al. | 370/60 |
| 4,759,015 | 7/1988 | Takai et al. | 370/86 |
| 4,760,572 | 7/1988 | Tomikawa | 370/94 |
| 4,768,190 | 8/1988 | Giancarlo . | |
| 4,769,813 | 9/1988 | Lenart | 370/86 |
| 4,780,821 | 10/1988 | Crossley | 364/200 |
| 4,807,224 | 2/1989 | Naron et al. | 370/94 |
| 4,813,039 | 3/1989 | Yoshihiro | 370/89 |
| 4,815,071 | 3/1989 | Shimizu | 370/60 |
| 4,849,968 | 7/1989 | Turner | 370/94 |
| 4,866,702 | 9/1989 | Shimizu et al. | 370/60 |
| 4,881,074 | 11/1989 | Reichbauer et al. | 340/825.05 |
| 4,896,934 | 1/1990 | Arthurs et al. | 350/96.16 |
| 4,930,122 | 5/1990 | Takahashi et al. | 370/85.15 |
| 4,935,922 | 6/1990 | Wicklund et al. | 370/60 |
| 4,949,083 | 8/1990 | Hirabayashi | 340/825 |
| 4,970,720 | 11/1990 | Esaki | 370/85.2 |
| 4,979,167 | 12/1990 | McCool | 370/85.4 |
| 4,993,024 | 2/1991 | Quinquis et al. | 370/94.1 |
| 5,003,536 | 3/1991 | Tanaka et al. | 370/94.1 |
| 5,031,175 | 7/1991 | Tanaka et al. | 370/85.1 |
| 5,119,372 | 6/1992 | Verbeek | 370/94.1 |

OTHER PUBLICATIONS

XTP Multicase Mechanisms–Alfred C. Weaver et al.–Information Transfer–pp. 3–12.
Patent Application of O'Dowd–Ser. No. 296,524–filed Jan. 6, 1989–54 pages.
IEEE 1985 National Aerospace & Electronics Conference vol. 1, May 1985, IEEE New York pp. 91–94–by R. J. Folmar "Distributed Memory Netword: An 8 Gigabit Fiber Optic Tightly Coupled System".

*Primary Examiner*—Wellington Chin
*Attorney, Agent, or Firm*—Ratner & Prestia

[57] ABSTRACT

A data communications network in which multiple host processors are linked in a ring network by respective network interface processors or nodes includes circuitry in each of the nodes which aids in the implementation of a distributed resource locking scheme and a reliable multicasting system. The circuitry includes a packet generator which automatically generates specialized packets that are used to procure resource locks and to implement the multicast system. In addition, the node includes circuitry which may be used to modify the contents of a received packet and circuitry which automatically retransmits the packet onto the network. The node is controlled by a set of state machines which implement the resource locking and multicasting protocols. In addition, the nodes include circuitry which detects congestion in the node and in the network and acts automatically to relieve the congestion. This circuitry notifies other nodes when a receive queue in the node is almost full so that the other nodes can suspend communications with the node. Other circuitry detects when the node is unable to transmit a message to cause the node to allocate an owned packet which may be used only by the node to transmit data.

26 Claims, 24 Drawing Sheets

| LOCK ID | LC | PEND TIME | |
|---|---|---|---|
| SOCKET ID | IN GRP | BP | BA |
| LOCK ID | LC | PEND TIME | |
| LOCK ID | LC | PEND TIME | |
| LOCK ID | LC | PEND TIME | |
| SOCKET ID | IN GRP | BP | BA |
| SOCKET ID | IN GRP | BP | BA |
| NULL | | | |

FIG. 7A

| NODE 2 | STOP |
|---|---|
| NODE 3 | STOP |
| NODE 4 | STOP |
| NODE 5 | STOP |
| NODE 6 | STOP |
| NODE 7 | STOP |
| NODE 8 | STOP |

FIG. 7B

NETWORK ARCHITECTURE SUITABLE FOR MULTICASTING AND RESOURCE LOCKING

BACKGROUND OF THE INVENTION

This invention concerns data communications networks and in particular a network having architectural features which facilitate the implementation of an efficient resource locking mechanism and a reliable multicasting system.

A typical communications network includes multiple data processing systems which are interconnected by one or more data paths. Networks are usually described by their topology (e.g. ring or star), by the set of protocols that control network resources, by the communications services that are provided to the host data processing systems and by the implemented applications.

A network is judged by how efficiently it can transport data between two host processors. There may be large variations in efficiency even among networks having a single topology. For example, a ring network system which implements a slotted ring protocol, operates well when the applications communicate frequently using short, single packet messages, but is less efficient with applications that routinely transmit larger amounts of data. A ring network which uses a token ring protocol, however, is more efficient when large blocks of data are routinely transferred.

A key factor affecting the performance of a data communications network is the level of involvement of the host processors. This, in turn, depends on how much of the protocol is implemented in hardware and how much is implemented in software. Viewed, for example, in terms of the Open Systems Interconnection (OSI) model, a typical network may be defined as having seven layers: physical, data link, network, transport, session, presentation and application. Although many networks cannot be easily classified in terms of the OSI layers, it is often convenient to describe their network functions in terms of the analogous OSI layers.

Generally, the standards organizations have been concerned mainly with the lower layers of the network architecture, corresponding to the physical and data link layers of the OSI model. The higher layers such as the OSI network, transport, session and presentation layers have, for the most part, been left to be defined by the various network providers.

Although some providers have implemented some functional elements of these higher layers in hardware, the more typical implementation provides these functions through software running on the host data processors. Although these software defined protocols may provide greater flexibility than an equivalent network implemented in hardware, they are inherently slower.

A system in which the physical, data-link, network and transport protocols may be implemented in hardware is disclosed in allowed U.S. patent application Ser. No. 07/296,524 entitled PACKET SWITCHING, which is hereby incorporated by reference for its teachings on network architecture. In this system, several host processors are connected in a star configuration having a compact ring network at the hub of the star. The ring network transmits data via a 16 bit parallel data path among multiple network interface circuits, or nodes, which are connected by segments of the data path to form a ring. Because of its compact size and parallel data paths, this ring network has a relatively large effective bandwidth (e.g. 3.2 Gb/s).

Each star connection from the hub to one of the host processors has a lower effective data bandwidth. These connections may be, for example, twisted pair transmission lines having data bandwidths of as much as 100 Mb/s.

In addition to the relatively high aggregate bandwidth achieved by its architecture, the system has further advantages over conventional ring networks since a portion of the transport and network layers of the protocol is implemented in hardware. This hardware is in the ring nodes and in switch interface circuitry which couple each ring node to its respective host processor.

In the system described in the above referenced U.S. patent application, a process running on the host processor provides a block of data to be transferred to another process running on another host. This destination process is identified by a node address and a socket number. The node and socket identifiers may be provided, for example, from a network description database, a copy of which may be accessible by any host from the session layer of the protocol.

The switch interface circuitry of the node receives the block of data from the application and formats it into multiple smaller packets, each of which identifies a particular data buffer and an offset in that buffer as the destination of the data in the packet.

When these packets are received at the destination node, the switch interface circuitry coupled to the destination host processor unpacks the data and stores it in the designated destination buffer. The last packet formed by the source switch interface circuitry includes a checksum for all of the packets in the block. The destination switch interface circuitry compares this checksum to one that it has calculated from the received data. If the two checksums match, an acknowledge (ACK) packet is sent through the network to the source switch interface circuitry. Otherwise, a negative acknowledge (NAK) packet is sent, to cause the sender to retry sending the block of data.

Using this hardware-implemented protocol, the source host processor is only involved with the data transport protocol when the data is initially supplied to the network and when the entire block of data has been received at the destination processor. The minimal involvement of the host processor in this network protocol increases system performance relative to a conventional software implemented protocol, since the host processors are not interrupted when each packet is sent and received. In addition, the efficiency of the data transport is increased since the packeting and depacketing operations are performed by application specific hardware rather than by software running on a general purpose computer.

The above referenced U.S. patent application does not, however, address other aspects of the protocol in the transport layer. In particular, no methodology for communication among multiple processes, running on different host processors as a multicast group, is disclosed.

SUMMARY OF THE INVENTION

The present invention is embodied in a data communications network which includes specialized circuitry for implementing a distributed resource locking scheme and a reliable multicasting system. In addition, the network circuitry regulates traffic among the nodes to prevent any one node from being saturated and to ensure that all nodes may send data irrespective of the total volume of data being transferred by the network.

The present invention is embodied in a packet-switched network which includes a plurality of interconnected nodes coupled to respective host data processors. Each node includes a memory which may be addressed by the contents of a predetermined address field in the packet and which provides information relevant to how the packet is to be handled. Circuitry in the node is Responsive to this information to change the type of a received packet and transmit it back onto the network without intervention from the host processor.

According to one aspect of the invention, the packet includes a request for a resource lock. The node memory is addressed by the lock identifier and provides information on the status of the lock. This information is used by circuitry in the node to selectively procure the lock for the requesting process and to notify the process when the lock has been procured.

According to another aspect of the invention, this packet includes data to be transmitted to all members of a multicast group. The node memory is addressed by the group identifier and provides information indicating whether a process running on the associated host processor is a member of the group. Circuitry in each of the nodes is responsive to the information in the packet and in the node memory to route individual packets to the respective processes in the multicast group identified by the packets.

According to yet another aspect of the invention, the node memory is addressed by the destination node of a packet to be transmitted by the associated host processor. The memory provides an indication of the status of the destination node. Circuitry in the node is responsive to this information to selectively inhibit data transmission to a busy node.

According to another aspect of the invention, the node includes a packet buffer which may hold one or two packets or parts thereof received from source nodes for transmission to destination nodes. During normal operation, circuitry in the node allows only a preset number of packets in the packet buffer. When the volume of data being transferred through the network is large and the host processor has data to transfer, the node allows an additional packet to be stored in the packet buffer. While this packet is stored, circuitry in the node transmits a pending packet from the host processor and marks this packet for exclusive use of the node.

BRIEF DESCRIPTION OF THE DRAWINGS

FIGS. 7a and 7b are data structure diagrams which illustrate the format of the data held by the content addressable memory (CAM) and the start/stop memory, respectively, shown in FIG. 2.

FIGS. 9a through 9j are flow-chart diagrams which illustrate the operation of a reliable multicast system that uses the network shown in FIGS. 1-3.

DETAILED DESCRIPTION OF THE INVENTION

The embodiments of the invention described below are in the context of a ring network having many of the characteristics of the network described in the above-referenced U.S. patent application. It is contemplated, however, that the invention may be practiced using other network configurations, such as other types of ring or bus oriented networks or even traditional star networks.

Overview

Figure 1:
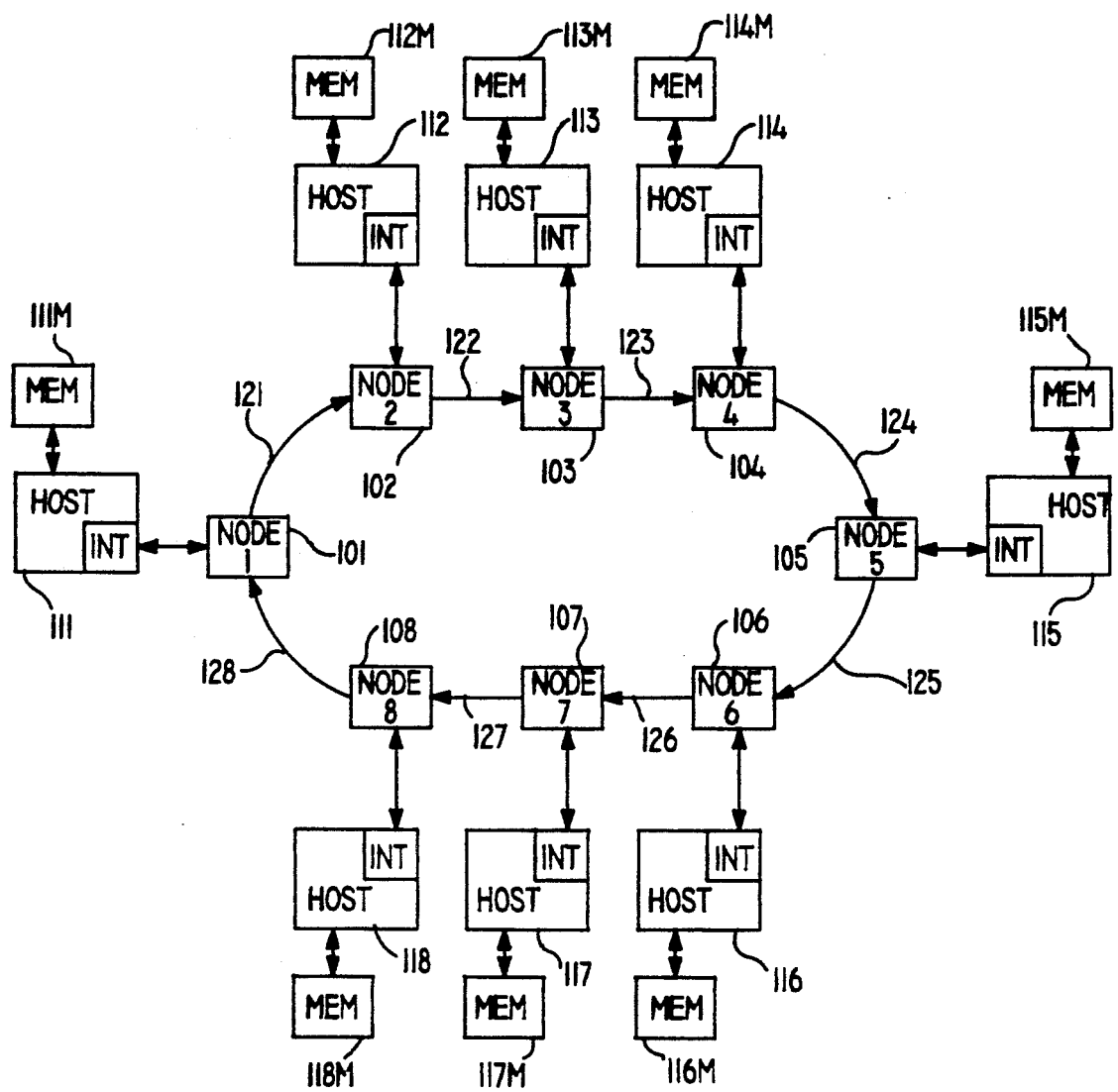
FIG. 1 is a block diagram of an exemplary data communications network which may include an embodiment of the invention.

FIG. 1 is a block diagram of a ring network which includes an embodiment of the present invention. This network has several features, realized in hardware in each of the nodes, which assist in the implementation of a fully distributed resource locking scheme and a multicasting system and which prevent any one node from becoming saturated. In addition, each node includes circuitry which, when data flow through the network is very heavy, allocates and marks a packet for the exclusive use of the node to ensure that the processes coupled to the node can communicate with processes coupled to other nodes.

A key feature of this architecture is the ability of each node to recognize and process different types of packets without assistance from the host processor. In addition, each node maintains a memory which holds data relating to active system locks and multicast groups. Using this memory and a number of predefined packet types, the collective nodes implement a distributed resource locking scheme and a substantial portion of a reliable multicasting scheme.

A resource locking system controls access to a resource from among several competing requestors. The resource may be a printer which processes running on two hosts want to use or it may be a database record containing the account information of a bank customer. In either of these examples, only one processor should be allowed to access the resource at any one time. To prevent multiple simultaneous accesses, a process may only be allowed to use the resource when it has procured a lock.

Conventional resource locking schemes localize each lock to a single host processor or some central location and require each requesting process to obtain the lock through a process which is active on the respective processor. The exemplary resource locking scheme is more efficient than these conventional schemes since many of the operations involved in procuring and liberating a resource lock are implemented in the circuitry of the network nodes.

To procure a lock, a host processor sends a lock request to the node. The node sends a first packet to ensure that no other node is attempting to procure the lock and then sends a second packet to determine if any other node already has the lock. If so, the node sets the context of the lock to SLEEPING, that is to say, it indicates to whatever local process may be requesting the lock that it must wait for another process or processes to release the lock. Otherwise, it grabs the lock and notifies the requesting process that it has procured the lock. The distributed locking system is described in greater detail below with reference to FIGS. 8a through 8g.

The multicasting system provides a method of transmitting messages to a group of host processors on the ring. A host processor in a multicast group may either send a single packet message or a multiple packet message to the other host processors in the group. The exemplary system ensures reliable delivery of multiple packet messages by pre-allocating a receive buffer at each node before the transmission begins. Conversely, single packet messages may be sent at any time by any member of the group without pre-allocating a buffer.

To send a multiple packet message, the transmitting host processor first sends a message to all members of the group requesting that they allocate a buffer for the multi-packet message. When this message returns to the sender, all other hosts in the multicast group are guaranteed to have a buffer available to receive the multi-packet message. Once it has received this assurance, the transmitting node sends all of the packets in the multi-packet message. If the sending host has another multi-packet message to send, it sends a new message to all of the members of the group requesting a new buffer before it sends the next multi-packet message.

A typical sequence of multiple packet messages may be, for example, a continuous motion video signal being sent from one host to a group of other hosts in a multicast group. In this instance, each video frame may be a new multiple packet message.

Beyond resource locking and multicasting, each node includes a second memory which keeps track of the ability of all of the other nodes to receive data packets. If the number of packets waiting in the node to be transferred to the host becomes large, the node automatically formats and transmits a stop packet to every other node in the network. This stop packet conditions the other nodes to mark their local memory cells to indicate that the congested node unable to receive data packets. Responsive to this entry, the receiving nodes will not transmit data packets to the congested node until a start packet is received and the memory cell for the congested node is cleared. This start packet is sent by the congested node after the congestion on the link to its host processor has been relieved and the number of packets waiting to be sent to the host falls below a preset threshold.

Finally, each node includes a transfer buffer which holds any packets that may be received from upstream nodes while the node is transferring data to a downstream node. This transfer buffer normally holds at most one full packet. When the network becomes congested, however, the buffer may be expanded to hold an additional packet. This additional packet creates a slot on the loop into which the node may insert a transmitted packet.

To ensure that the node can continue to communicate, this packet is marked as being owned exclusively by the transmitting node. Thus, it continually circulates around the loop until either the data traffic becomes less congested or the node no longer needs to transmit data. At this point, the owned packet is deallocated and the transfer buffer is collapsed to its original size.

DETAILED DESCRIPTION OF THE EXEMPLARY EMBODIMENTS

In the network shown in FIG. 1, multiple host processors 111–118, having associated memories 111M–118M, are coupled to the ring network via respective host interface circuits INT which communicate directly with respective network interface processors, or nodes, 101–108, respectively. Each node in the network is connected to the next sequential node via a 19-bit unidirectional data communications path. Node 101 is connected to node 102 via the path 121, nodes 102 and 103 are connected via the path 122, and so on until the path 128 from node 108 to node 101 completes the ring.

In normal operation, a process being executed on one host processor, for example 111, needs to transfer a block of data to another process being executed on a different host processor, say 114. To effect this transfer, the host 111 sends a message to its interface circuit identifying the block of data, the node to which the other processor is connected, and the identity of the process which is to receive the data. The interface circuit takes 16-bit data words from the block, 16 words at a time, formats them into a packet, such as is shown in FIG. 4b, and sends the packet to the node 101.

In this packet, a 16-bit socket identifier (SOCKET ID) identifies the destination process and a buffer designated by that process to receive the data, an eight-bit destination loop address (DEST LA) identifies the node 104 which is to receive the packet and an eight-bit source loop address (SOURCE LA) identifies the node 101 from which the packet is sent. A ten-bit packet type field (TYPE) identifies the packet as containing data. Also included in the third word are three one-bit flags, deletable (D), round-trip (R) and owned (O). The function of these flag bits is described below in greater detail. Finally, a 16-bit field (OFFSET) is interpreted to identify an offset into the designated buffer area, in the memory 114M into which the sixteen 16-bit data words in the packet are to be written.

As described below, node 101 places the formatted packet onto the ring where it passes, via the data paths 121, 122 and 123 through the nodes 102 and 103 until it reaches the destination node 104.

When the packet is received at node 104, it is transferred to the interface circuitry INT which couples host processor 114 to the network. This circuitry generates a destination address in the memory 114M for the 16 data words in the packet. The destination address is generated from the information in the SOCKET ID and OFFSET fields of the packet which identify the destination buffer and the offset into that buffer. The interface circuitry then transfers the sixteen words of data from the packet to the addressed locations in the memory 114M.

Figure 4A:
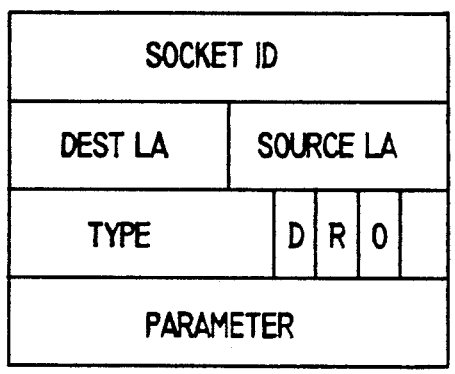
FIGS. 4a and 4b are data structure diagrams which illustrate exemplary packets suitable for use with the circuitry shown in FIGS. 1-3.
Figure 4B:
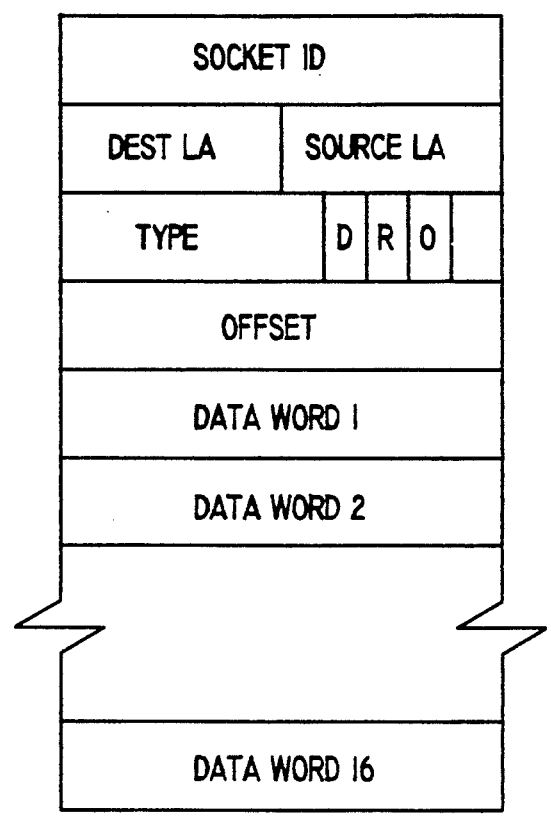

As shown in FIG. 4a, a short packet comprising only four words may also be transmitted between hosts or between nodes. Short packets are sent, as described below, to procure and liberate resource locks, to guarantee that multicast buffers are allocated and to control the volume of data being sent to any one node. A short packet may originate from a host or from a node, depending on how it is to be used.

Figure 2:
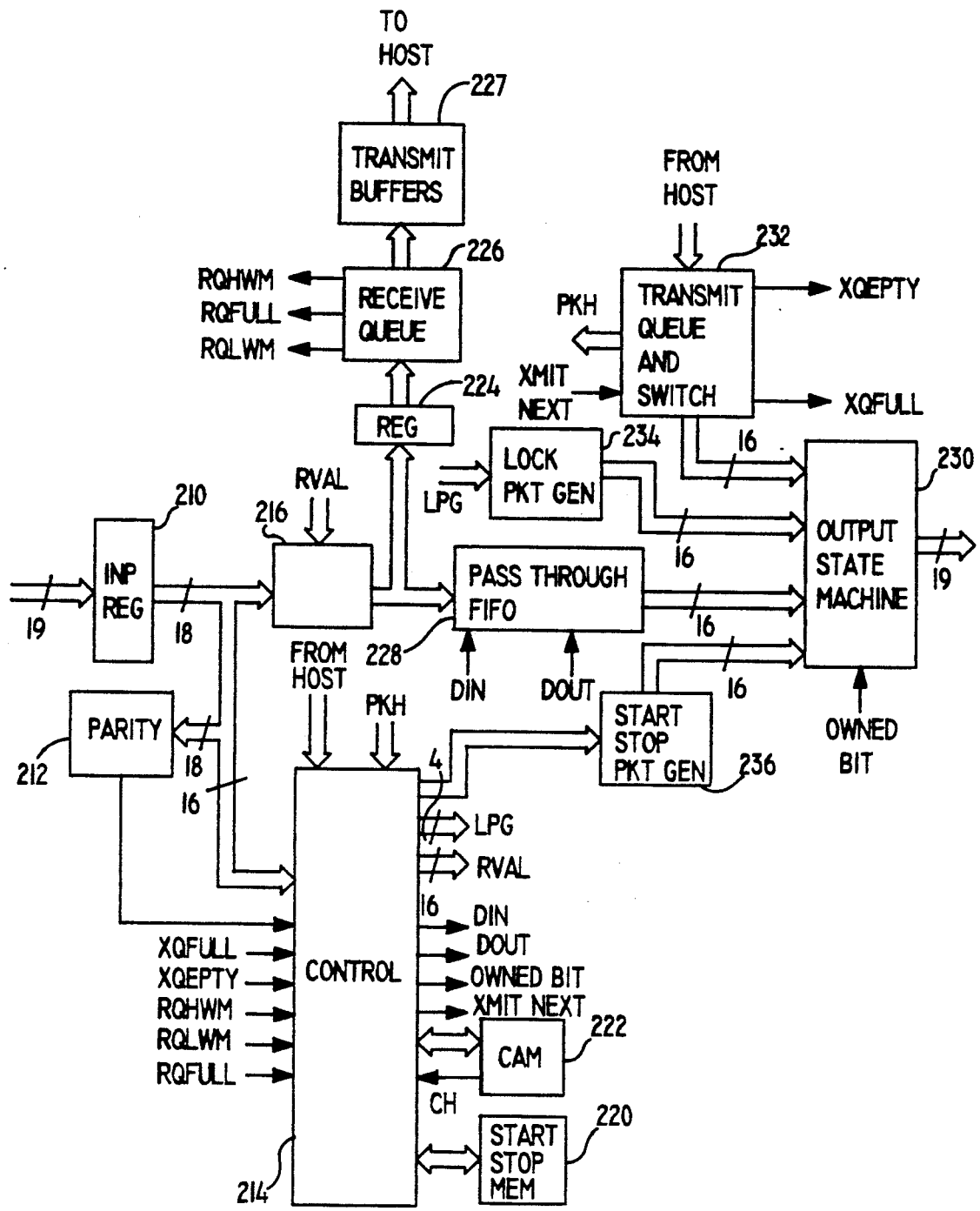
FIG. 2 is a block diagram of circuitry suitable for use as one of the nodes in the data communications network shown in FIG. 1.

FIG. 2 is a block diagram which shows details of the structure of one of the switch nodes 101 through 108. In the circuitry shown in FIG. 2, a 19-bit bus connects the output of the previous node on the loop (not shown) to the input register 210. Of these 19 bits, 16 are data, two are parity and one, FIRST IN (shown in FIG. 3) is a pulse signal which indicates that the first word of a packet is being applied to the register 210.

Responsive to the FIRST IN signal, the input register 210 loads the 18-bit first word of the packet and applies it to the parity checking circuitry 212. The 16 bits of data from this first word are simultaneously applied to control circuitry 214 and to a modify register 216. After this first word of the packet has been processed, the remainder of the data values in the packet are loaded in sequence into the input register 210. These words are loaded in response to a clock signal (not shown) which is distributed to all of the nodes.

The parity checking circuitry 212 calculates the parity of the 16 data bits and compares it to the two received parity bits. If differences are found, a parity error is indicated to the control circuitry 214.

The control circuitry 214 is a finite state machine, or more properly, a group of interconnected finite state machines, which control the remainder of the node circuitry in response to the first four words of the packet, to commands and data provided by the host processor and to various internally generated signals. The functions performed by the control circuitry are described below with reference to FIGS. 5a through 9j.

To perform these functions, the control circuitry 214 is coupled to a start/stop memory 220 and to a content addressable memory (CAM) 222. The function of the start/stop memory 220 is described below with reference to FIGS. 5c, 5d and 7b, while the function of the CAM 222 is described below with reference to FIGS. 7a and 8a through 9j. The control circuitry 214 also includes various state variables, such as OWNERSHIP and STOPPED, which are used as described below. These state variables may be one-bit boolean values which are accessible to one or more of the individual state machines that constitute the control circuitry 214.

The modify register 216 is responsive to a 16-bit value, RVAL, provided by the control circuitry 214 to selectively change individual bits of the 16-bit data values provided by the input register 210. Using this register, the control circuitry 214 can change individual bits in packet header words while the packets are being transferred through the node. The function of the modify register 216 is described below in greater detail with reference to FIGS. 3 and 8a through 9j.

Data values provided by the modify register 216 are applied to a register 224 which holds the data value while the control circuitry 214 determines if the packet is to be placed into the receive queue 226 and transferred to the host processor. In this embodiment of the invention, the control circuitry 214 examines the first three words of the packet to make this determination. While these words are being examined by the control circuitry 214, they are provisionally stored in available space in the receive queue 226. If it is later determined that the packet should not be received, these words in the receive queue 226 are invalidated and made available. If it is determined that this packet is to be received, the control circuitry 214 continues to store the words in the receive queue 226, in sequence from the register 224.

In this embodiment of the invention, the receive queue 226 contains sufficient storage space for 25 packets. When all 25 packet positions are occupied, the queue 226 sends a signal RQFULL to the control circuitry 214. As set forth below, this signal conditions the control circuitry to stop sending data to the receive queue.

The receive queue is organized as a first-in first-out (FIFO) memory where each packet position may be considered a separate cell of the memory. As multiple packets are received they are shifted into respective packet positions. When a given packet position is filled, the packet is transferred to a transmit buffer 227. The buffer 227 includes 15 packet buffers, each coupled to a respectively different logical channel to the host processor. In the exemplary embodiment of the invention, these logical channels are time-division multiplexed onto the signal transmitted from the node to the host via the twisted pair data path. It is contemplated, however, that multi-bit data paths between the node and the host may also be used. In either instance, in the exemplary embodiment of the invention, as many as 15 stored packets may be transferred according to a time-division multiplex protocol from the transmit buffers 227 of the node to the associated host processor.

The receive queue provides two other signals, a high-water mark signal RQHWM and a low-water mark signal RQLWM. These signals indicate respectively, when the number of packets held by the queue is greater than a first predetermined number and less than a second predetermined number. The signal RQHWM is used by the control circuitry 214 to selectively inhibit other nodes and their hosts from sending packets to the node while the signal RQLWM is used to release the inhibition. This process is described below in detail with reference to FIGS. 5c, 5d and 7b.

In addition to the receive queue, the modify register applies the received packet words to a pass though FIFO memory 228. This memory provides storage for packets being transferred around the ring. If the node is transmitting a packet while another packet—which is merely being passed through the node—is being received, the words of the received packet are stored in the FIFO 228 until the packet being transmitted has been sent. Then, the stored message is shifted out of the FIFO 228 and onto the ring. The operation of the FIFO 228 is described below in greater detail with reference to FIG. 3.

The node transmits packets provided by the host via a transmit queue 232. This queue holds as many as 15 packets to be transmitted to other nodes via the ring network. When packets are waiting in the transmit queue to be sent, the control circuitry 214 senses either a gap in the data being transferred through the node and/or, that the pass-through FIFO 228 has sufficient free space to hold a full packet. The control circuitry then conditions an output state machine 230 to transmit one of the packets which is waiting in the transmit queue. Alternatively, the control circuitry 214 may condition the state machine 230 to transmit a packet from the pass-through through FIFO, or one of two short packets, generated by the lock packet generator 234 or start/stop packet generator 236. The operation of the output state machine 230 is described in more detail below with reference to FIG. 3. The operation of the lock packet generator 234 is described below with reference to FIGS. 8a through 8g and the operation of the start/stop packet generator 236 is described below with reference to FIGS. 5c and 5d.

Figure 3:
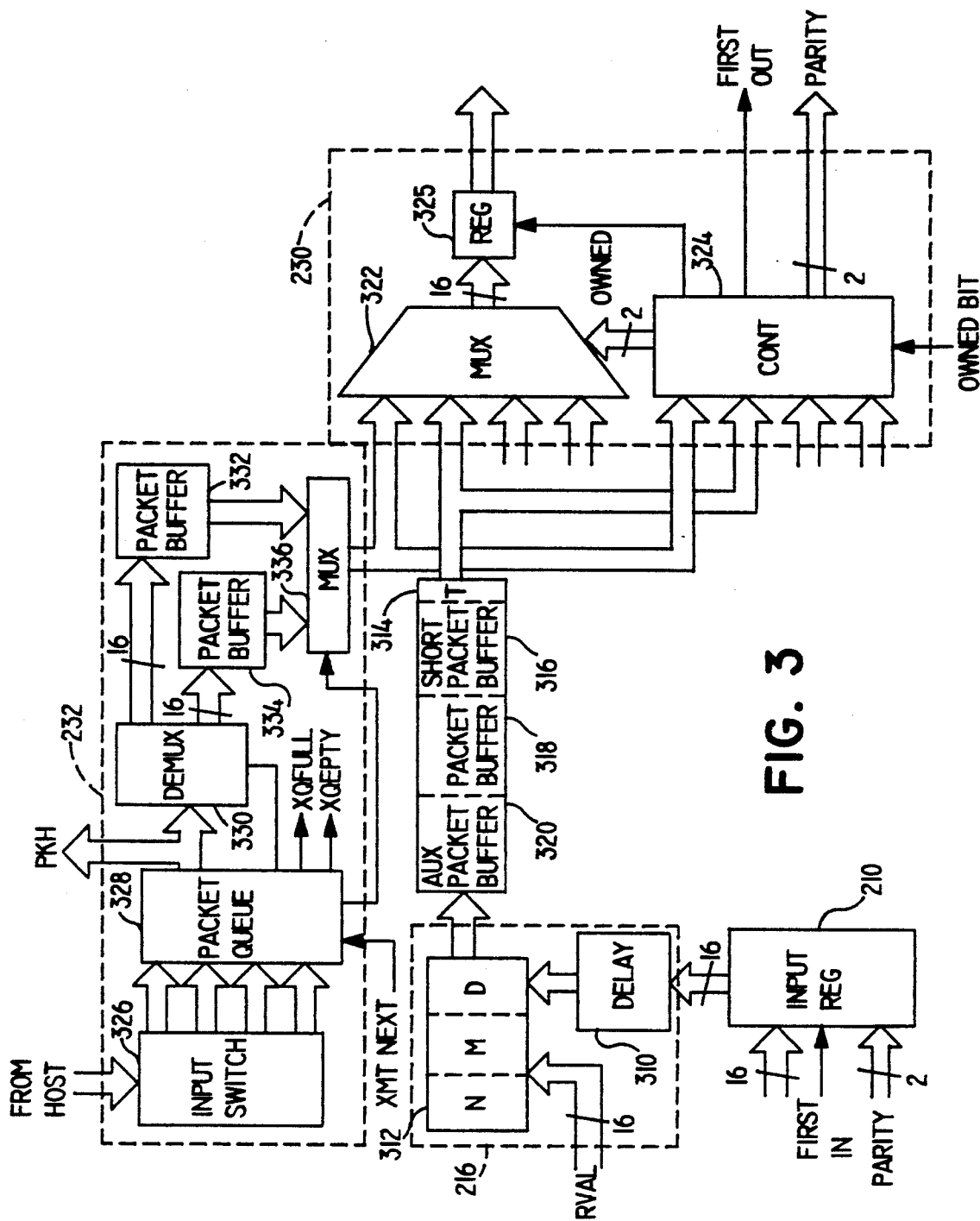
FIG. 3 is a block diagram of circuitry which shows details of portions of the node circuitry shown in FIG. 2.

FIG. 3 is a block diagram which illustrates a a portion of the node circuitry shown in FIG. 2 in greater detail. The 16 data bits loaded into the input register 210 are applied to a delay element 310 of the modify register 216. This delay element delays the word by a number of clock periods sufficient to allow the control circuitry 214 to determine if any bits in the word need to be changed. From the delay element 310, the word is loaded into a stage D of a three stage register 312.

The other two stages of the register, N and M are loaded by the control circuitry 214 via the 16 bit data path RVAL. Stage N holds the new value for selected bits of the word which are to be modified. Stage M holds a mask in which only those bits that are to be modified are set. In operation, the bits of stage N which to the bits of stage M are selectively loaded into stage D to produce the modified word.

From the modify register 216, the packet words are applied to the pass-through FIFO 228. As shown in FIG. 3, the FIFO 228 includes four separate storage areas: a timing buffer 314, a short packet buffer 316, a full packet buffer 318 and an auxiliary packet buffer 320. As 16-bit words from the modify register 216 are applied to the FIFO 228, they are stored synchronous with a data input clock signal, DIN, provided by the control circuitry 214.

When the FIFO is empty, each packet word is stored in the timing buffer 314 before it is transferred, synchronous with a data output clock signal DOUT, to the output state machine 230. If the output state machine 230 is busy as data is being shifted into the FIFO 228, the incoming data words are stored in the short packet buffer 316 and, if necessary in a portion of the full packet buffer 318. The combination of these two buffers allows the node to transmit a full packet and a short packet while packets are being received from the upstream node. In normal operation, if a full packet is waiting in the pass-through FIFO 228, the control circuitry 214 inhibits the transmit queue 232 from sending any packets onto the network through the output state machine. This inhibition is removed when the pass-through through FIFO 228 is empty or contains only a short packet.

The auxiliary packet buffer is used only when the network is so congested that the pass-through FIFO 228 does not become empty, and because of this, a message remains waiting in the transmit queue for a predefined interval. When these conditions have been met, the control circuitry 214 allows this area of the pass-through FIFO to be filled with an incoming packet while one of the packets in the transmit queue is sent over the network. This transmitted packet is "owned" by the node and remains active for the exclusive use of the node until either the network congestion eases or the number of packets waiting in the transmit queue falls below a preset threshold. The use of this buffer and the handling of owned packets is described in greater detail below with reference to FIGS. 6a and 6b.

The host processor sends packets, which are to be transmitted to another host processor, to the input switch 326 of the node. Like the data path from the node to the host, the data path from the host to the node includes 15 logical channels, each of which may be sending one packet from the host to the node. Each of these packets may be associated with a respectively different process running on the host.

The input switch 326 converts the received signals into packets of 16-bit words and transfers these packets to a receive buffer 328. The receive buffer provides the oldest packet in the queue to the input port of a demultiplexer 330 and simultaneously provides the packet header information to the control circuitry 214 via the data path PKH. The demultiplexer 330 routes the packet from the receive buffer 328 to one of two packet buffers 332 and 334. The output ports of these buffers are coupled to the input ports of a multiplexer 336. Both the demultiplexer 330 and the multiplexer 336 are controlled by a signal provided by the receive buffer 328.

The packet buffers 332 and 334 implement a double buffering scheme in which a packet in one of the buffers, e.g. 332, may be sent onto the network through the output state machine 230 while another packet is being loaded, from the receive buffer 328, into the other buffer e.g. 334. Thus, the control signal for the demultiplexer 330 conditions it to direct packet words into one of the buffers 332 and 334 while the control signal for the multiplexer 336 conditions it to extract words from the other buffer.

Packet words which are to be sent onto the network are applied to a multiplexer 322 and to a controller 324. The controller 324 selects which of the packets from four competing sources is sent onto the network. It also calculates the parity for each packet word and generates a signal FIRST OUT which becomes the FIRST IN signal for the next node. In addition, the control circuitry 324 causes the OWNED bit of the packet to be set if, as described below, an owned packet is needed by the node. The four packet sources are the transmit queue 232, the pass-through FIFO 228, the lock packet generator 234 and the start/stop packet generator 236, all shown in FIG. 2.

In normal operation, when the pass-through FIFO 228 is empty, the priority for selecting a packet for transmission assigns the highest priority to packets from the start/stop generator 236 and progressively lower priority values to packets from the transmit queue 232, the lock packet generator 234 and the pass-through FIFO 228. When, however, the pass-through FIFO contains a full packet or more than one short packet, it is assigned the highest priority.

The following is a description of the operation of the network in terms of flow-chart diagrams. This description refers to the hardware elements of the system, described above. While the flow-chart diagrams used to explain these functions are commonly used to describe control software for a programmed processor, in this embodiment of the invention, they describe functions which are implemented as various finite state machines. Thus, these flow-chart diagrams describe control flow implemented in the control circuitry 214, shown in RE 2. It is well known that a software programmed general purpose computer may be replaced by an equivalent hard-wired finite-state machine. It is contemplated, therefore, that the control circuitry 214 may be replaced by one or more equivalent programmed computer processors.

These flow-chart diagrams are not in their simplest form. They are, however, in a form which produces a relatively compact hardware implementation of the state machines. A key factor in producing compact state machines is the sharing of portions of the machines.

This manifests itself in the flow-chart diagrams as similar or identical sequences of steps in the diagrams which describe the operation of different state machines. An example of this is the use of the round-trip bit in the multicasting state machines. As described below, it is not necessary to use this bit, however, it is economical to do so.

Figure 5A:
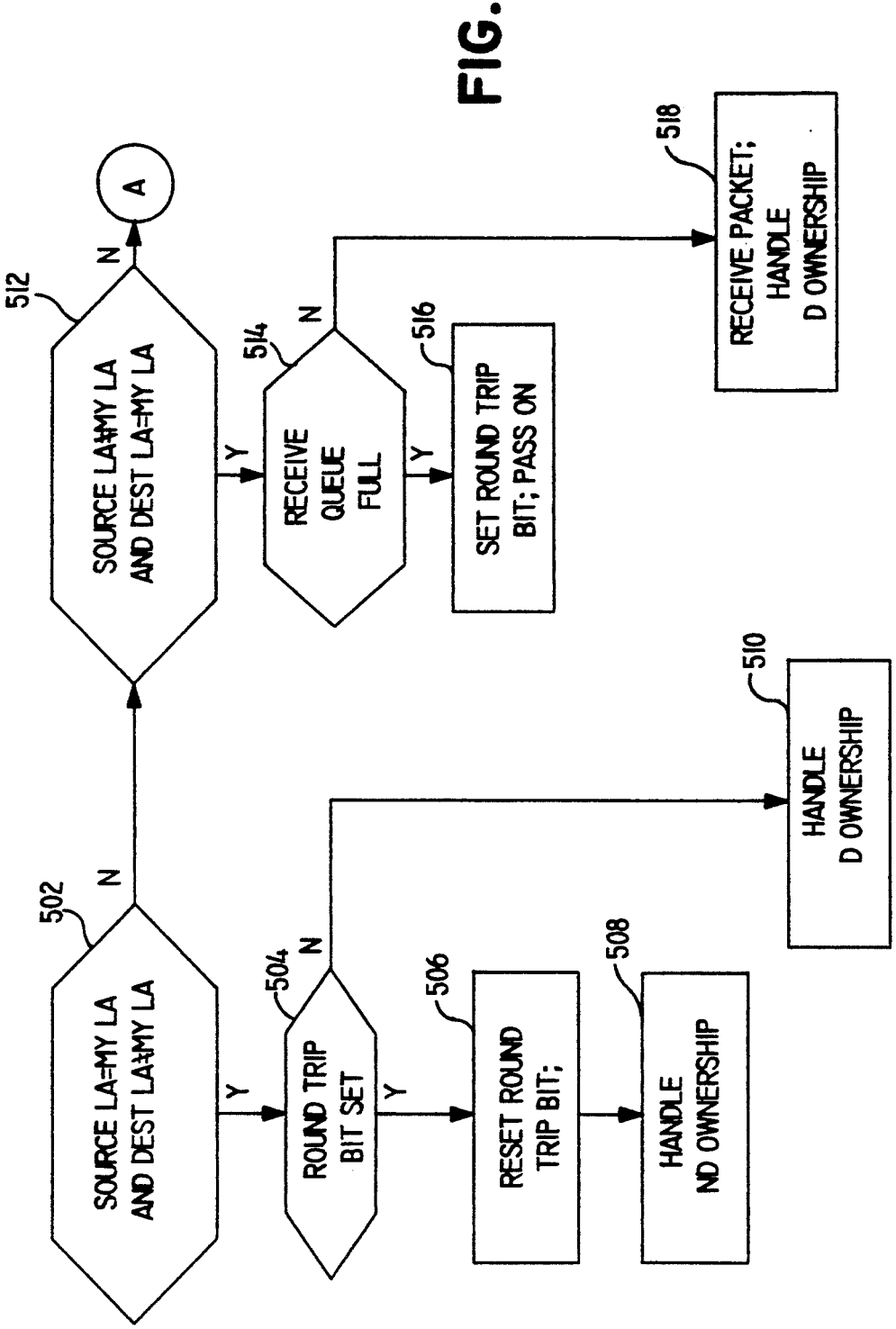
FIGS. 5a and 5b are a flow-chart diagrams which illustrate the operation of the node circuitry shown in FIGS. 1-3 when a data packet is received.
Figure 5B:
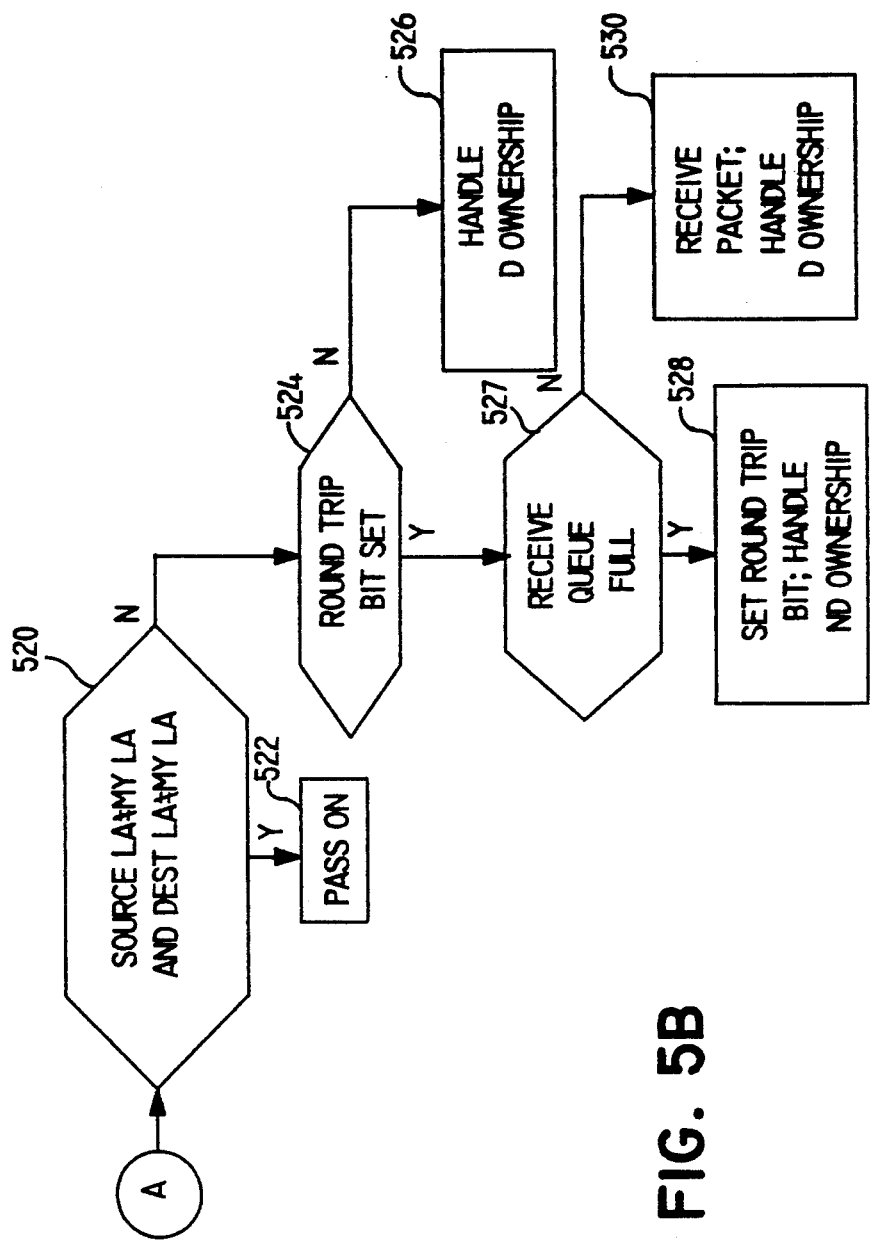

A processing step which precedes any of these flow-chart diagrams is the receipt and classification of the packet. Packets are classified by the SOCKET ID, DEST LA, SOURCE LA and TYPE fields appearing in the first three words. The flow-charts below are segregated based on the TYPE field of the packet. FIGS. 5a and 5b concern packets having a type of "normal." FIGS. 5c and 5d relate to "start" and "stop" packet types. FIGS. 8a through 8g concern packets having types related to a distributed locking scheme which is implemented using the network nodes. FIGS. 9a through 9j concern packets having types related to a reliable multicasting scheme.

FIGS. 5a and 5b concern the steps taken by a node when a packet having a TYPE field of "normal" is received. Packets of this type carry data from a first process, coupled to one node, to a second process, coupled to a different node. In an efficient network which is not used primarily for multicasting, this should be the most common type of packet.

The first step in FIG. 5a, step 502, determines if the source loop address (SOURCE LA) field of the packet designates this node and if the destination loop address (DEST LA) does not designate this node. If both of these conditions are met, step 504 is executed which determines if the round-trip bit (R) is set in the third word of the packet.

If the bit R is set, then this packet was previously sent by this node to the designated destination node. That node, however, was temporarily unable to receive the packet, perhaps because its receive queue was full. To delay receiving the packet, it set the round-trip bit and passed the packet back on to the loop. This is the packet that is now being received by the source node. In this instance, the source node, at step 506, resets the R bit and, at step 508, places the packet back on the loop to once again be received by the destination node. The step 508 invokes a state machine which implements a procedure, HANDLE ND OWNERSHIP, that is described below with reference to FIG. 6a. In addition to passing the packet back onto the loop, this state machine causes the output state machine 230 to mark the packet as owned by the source node if, as set forth below, the packet was previously owned and an owned packet is still required.

If, however, at step 504, the round-trip bit (R) is not set, step 510 is executed which invokes the state machine HANDLE D OWNERSHIP. This state machine deletes the packet unless it is an owned packet which is still needed.

A node may require an owned packet when so many packets are being transferred around the network, that the pass-through FIFO 228 of the node never contains at least one full packet for a predetermined time interval. As set forth above, in this instance packets in the transmission queue 232 of the node cannot be sent because packets from the pass-through FIFO 228 have a higher priority.

When, due to network congestion, the transmit queue has been full for an amount of time greater than a preset threshold, the node sets an internal logical value OWNERSHIP in the memory 218 and activates the signal DIN to store the next incoming packet into the auxiliary packet buffer area 320. While these data words are being stored, a packet from the transmit queue is marked as being owned, by setting the bit 0 in the third word of the packet, and sent over the network by the output state machine 230. The source loop address (SOURCE LA) field of this packet contains an identifier (MY LA) which designates this node as the source of the packet.

When this packet returns to the node after traveling around the loop, the control circuitry detects that this node was the source of the packet and after handling the data in the packet, invokes HANDLE D OWNERSHIP or HANDLE ND OWNERSHIP to handle the packet. While OWNERSHIP is set in the node, this packet continually circulates around the loop for the exclusive use of its identified node.

When this packet is received by its originating node, the control circuitry 214 sets a state variable to indicate that the packet is the owned packet for the node. As this packet progresses through the pass-through FIFO 228 and into the output state machine 230, the control circuitry 214 causes the output state machine to substitute a packet from the transmit queue 232 for the owned packet and to set the owned bit (bit 0 in the third word) to mark this substituted packet as the new owned packet. In the exemplary embodiment of the invention, a node may have only one owned packet at any given time.

When the number of packets waiting to be transferred falls below a threshold, the state variable OWNERSHIP is reset. The next time that the packet is received by the node, either the state machine HANDLE D OWNERSHIP deletes it, causing the node to send a packet from the FIFO 228 over the network in its place, or the state machine HANDLE ND OWNERSHIP resets its owned bit, causing it to be deleted in the normal operation of the network as described below. Deleting this packet empties the auxiliary packet buffer 320, returning the node to its original state.

Returning to FIG. 5a, if one of the conditions at step 502 is not met, step 512 is executed. This step determines if the SOURCE LA field does not designate this node while the DEST LA field does. If so, then this packet was sent by another node to be received by this node. Step 514 checks the state of the signal RQFULL which indicates if the data can be stored in the receive queue. If the receive queue cannot accept a packet, step 516 is executed which sets the round-trip bit (R) in the packet and sends the packet around the loop again. This operation delays the receipt of the packet by one trip around the loop in hope that space for at least one packet will be available in the receive queue when the packet returns.

If, at step 514, the receive queue for the node is not full, step 518 is executed. This step conditions the receive queue 226 to accept the packet and, by invoking the state machine HANDLE D OWNERSHIP, either deletes the packet or, if it is an owned packet and OWNERSHIP is set, retains it as an owned packet.

If the conditions at step 512 are not met, the process for handling a normal packet continues through the off-page connector A to FIG. 5b. In FIG. 5b, if neither the source loop address (SOURCE LA) nor the destination loop address (DEST LA) of the received packet indicate this node, then step 522 is executed which passes the packet without modification through the pass-through FIFO 228 and the output state machine 230 and onto the network.

If the conditions at step 520 are not met then, both the SOURCE LA and the DEST LA of the received packet indicate this node. In this instance, step 524 determines if the round-trip bit (R) is set. If not, step 526 deletes this packet unless it is an owned packet which is still needed.

If, at step 524, the round-trip bit (R) is set, then this packet was previously processed but there was no room in the receive queue. Step 527 determines if there is now room for the packet in the receive queue 226. If so, step 530 is executed which transfers the packet to the receive queue and invokes the state machine HANDLE D OWNERSHIP.

Otherwise, step 528 conditions the modify register 216 to set the round-trip bit, R, in the third word of the packet and transfers the packet back on to the loop by invoking the state machine HANDLE ND OWNERSHIP. This state machine transmits the packet onto the loop and causes the output state machine 230 to set the owned bit, O, in the third word of the packet if the packet is owned and the state variable OWNERSHIP is currently set for the node.

Figure 5C:
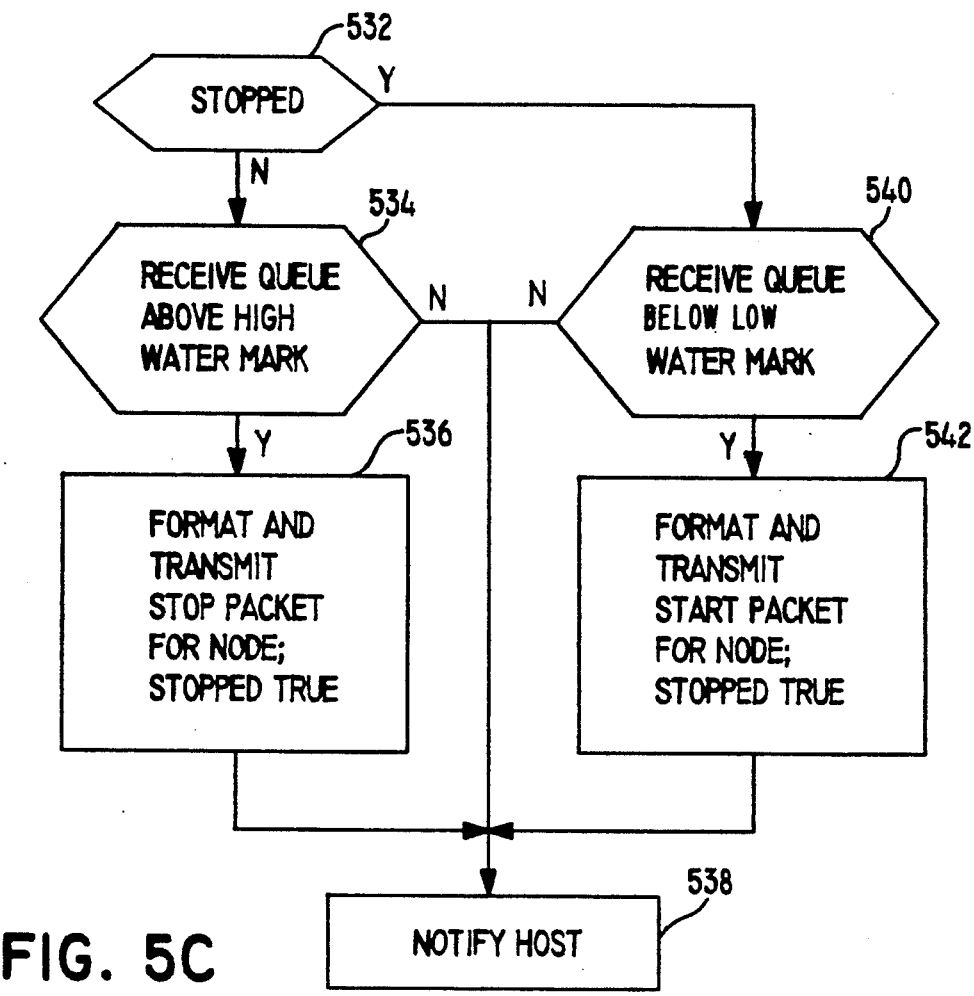
FIGS. 5c and 5d are flow-chart diagrams which illustrate the operation of the node circuitry shown in FIGS. 1-3 when message traffic to that node becomes excessive.

FIG. 5c illustrates the operation of a node when data traffic to the node threatens to fill up the receive queue 226. As set forth at several places in the detailed description, when a packet is received having its DEST LA field equal to MY LA and the receive queue 226 is full, the round-trip bit (R) of the packet is set and the packet is sent around the loop to be received at a later time. While this scheme ensures that the packet will be received eventually, it tends to waste network bandwidth. The stop/start state machine illustrated in FIGS. 5c and 5d mitigates this effect by notifying each of the other nodes in the system that this node will soon be unable to receive packets. In response to this notification, the other nodes hold the pending packets addressed to this node until they receive a message indicating that the node is again ready to receive packets.

Figure 5D:
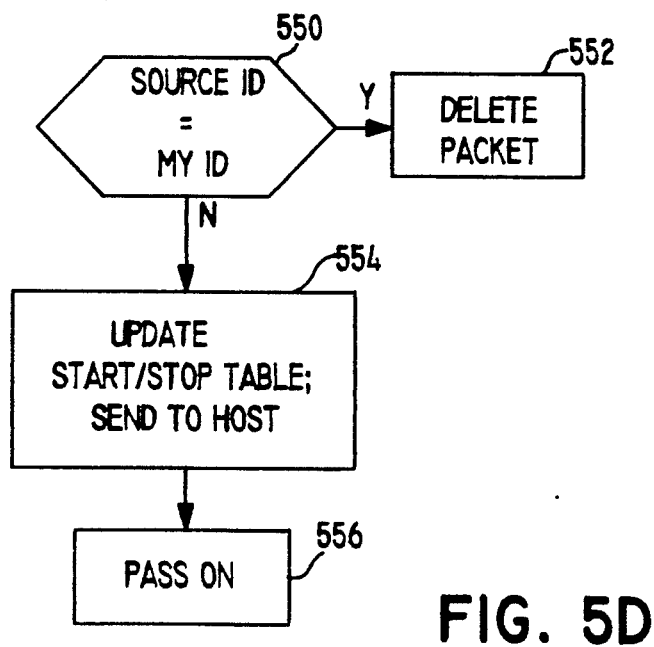

FIG. 5c illustrates a state machine in a node which generates start and stop packets for the node to be sent to the other nodes in the network. FIG. 5d illustrates a state machine in a node which responds to start and stop packets received from other nodes in the network. The start and stop packets are short packets generated by the start/stop packet generator 236, shown in FIG. 2, under control of the state machine described below with reference to FIG. 5c.

The state machine in FIG. 5c is invoked in two instances, 1) if the state variable STOPPED is reset and the receive queue asserts the high water mark signal RQHWM and 2) if the state variable STOPPED is set and the receive queue asserts the low water mark signal RQLWM. This is illustrated by the steps 532, 534 and 540 of FIG. 5c.

If, at step 534, the state variable STOPPED is reset and the signal RQHWM is asserted, then the receive queue is almost full and other nodes may be sending packets to the node. In this instance, step 536 is executed in which the control circuitry conditions the start/stop packet generator 236 to send a stop packet to all of the other nodes. This is a short packet having the node loop address (MY LA) in both the SOURCE LA and DEST LA fields and a TYPE field indicating that it is a stop packet. This step also sets the state variable STOPPED.

If the variable STOPPED is set and the low water mark signal, RQLWM, is asserted, step 542 is executed. This step resets the state variable STOPPED and conditions the start/stop packet generator 236 to send a start packet to the other nodes on the network. This packet is identical to the stop packet except that the type field is that of a start packet.

After step 536 or 542, step 538 is executed which notifies the host that data traffic to this node has either been stopped or restarted.

FIG. 5d illustrates the operation of the state machine which receives a start or stop packet from one of the other nodes. When the control circuitry 214 recognizes the incoming packet as a start packet or a stop packet, it invokes this state machine. As illustrated by step 550 of FIG. 5d, If the packet originated from this node, step 552 is executed which deletes the packet. Otherwise, step 554 is executed which updates the start/stop memory 220 with the information contained in the packet, sends the updated start/stop table to the host processor and, at step 556, sends the start/stop packet to the next node on the loop.

In this embodiment of the invention, the high water mark is set at 20 so that five packets may be received by a node even after it has issued a stop message. This number is selected to allow packets which have already been transmitted from a host processor to proceed without intervention (i.e. round tripping) by the node. Only pending packets, that is to say, those which have not yet been transmitted onto the network are affected by the start/stop mechanism. Packets which have already been transmitted by their source nodes continue to travel through the network until they reach their destination nodes.

In the exemplary embodiment of the invention, the low water mark is set at five so that the host is not idled while it is waiting to receive packets after the node has issued the start packet.

In the exemplary embodiment of the invention, the network is initialized with the state variable STOPPED set for each node. Each active node then detects that the state variable is set and that the RQLWM signal is asserted and sends a start packet to each other node. The data from these start packets is collected into the start/stop memory 220. The data in this memory is then transmitted, by each active node to its host processor.

FIG. 7b is a data structure diagram which illustrates the start/stop memory 220 for the node 101, labeled NODE 1. This memory has an entry, STOP, for each of the other nodes in the system. This entry is set if the node is unable to receive data and is reset if the node is able to receive data.

Figure 6A:
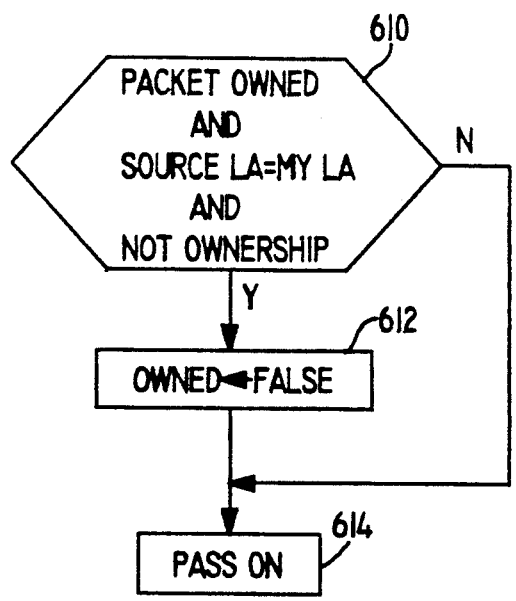
FIGS. 6a and 6b are flow-chart diagrams which illustrate the operation of the circuitry shown in FIGS. 1-3 when the network is congested and the node needs to transmit a packet.
Figure 6B:
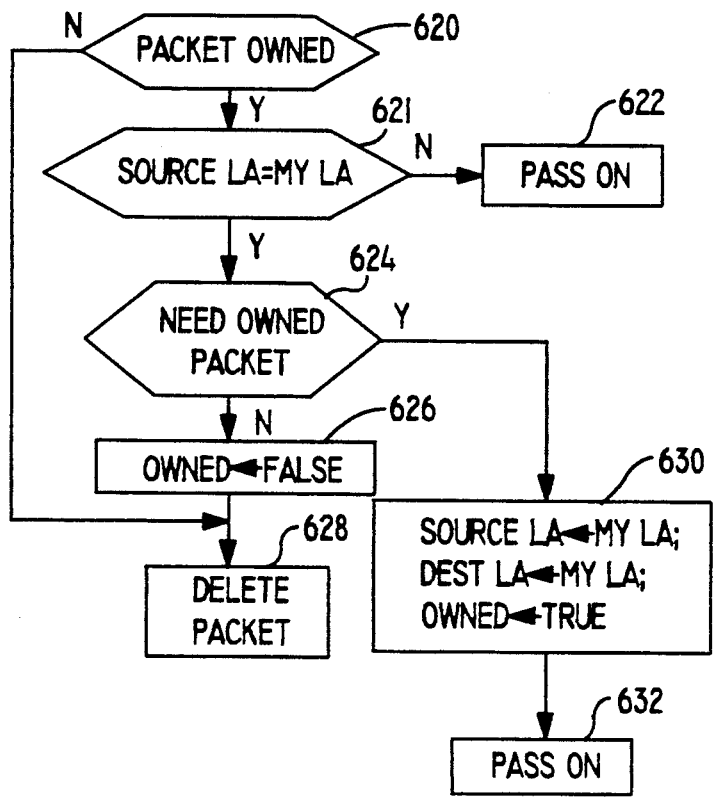

FIGS. 6a and 6b are flow-chart diagrams which illustrate the operation of the respective state machines, HANDLE ND OWNERSHIP and HANDLE D OWNERSHIP. The state machine HANDLE ND OWNERSHIP is invoked to change or retain the status of an owned packet when the packet is to be passed onto the network. The state machine HANDLE D OWNERSHIP is invoked to change or retain the owned status of a packet which would otherwise be deleted by the node.

In step 610 of FIG. 6a, the state machine HANDLE ND OWNERSHIP determines if the owned bit, O, is set in the third word of the packet, if the packet originated from this node and if the OWNERSHIP state variable is reset. If all of these conditions are met, then step 612 causes the owned bit of the packet to be reset.

If the conditions of step 610 are not met or after step 612, step 614 is executed which passes the packet onto the network through the pass-through FIFO 228 and output state machine 230 of FIG. 2. In this embodiment of the invention, the owned bit is reset by the output state machine 230, responsive to the signal OWNED BIT provided by the control circuitry 214.

At step 620 of FIG. 6b, the state machine HANDLED OWNERSHIP determines if the owned bit (O) is set in the packet. If not, step 628 is executed which deletes the packet. Otherwise, step 621 is executed which determines if the packet originated from this node. If the packet originated from another node, it is passed onto the network at step 622. Otherwise, step 624 determines if the state variable OWNERSHIP is set for the node. If not, then, at step 624, the state machine, using the modify register 216 causes the owned bit, O, of the packet to be reset and, at step 628, causes the packet to be deleted. If, at step 624, the state variable OWNERSHIP is set, then the node still needs an owned packet. Step 630 is executed which sets the source and destination loop addresses of the packet to indicate this node and causes the output state machine 230 to set the owned bit to true. Step 632 then passes the packet back on to the network through the pass through FIFO 228 and output state machine 230.

When this packet is received by the node after making a trip around the loop, the control circuitry 214 causes it to be overwritten by the next packet in the transmit queue 232. The control circuitry also causes the output state machine 230 to set the OWNED bit for the packet before it is transmitted onto the network.

FIG. 7a is a data structure diagram which illustrates the structure of the content addressable memory (CAM) 222. This is an associative memory which includes three types of records: lock records, multicast group records, and null records. The field which is searched to address the CAM 222 contains either a lock identifier (LOCK ID), a multicast group identifier (GROUP ID), or a value (NULL) indicating that the record is available. If a match is found between this field and the SOCKET ID field of a received packet, the other fields in the record are made available to the system as state variables. These fields are described in greater detail below with reference to FIGS. 8a through 9j.

Figure 8A:
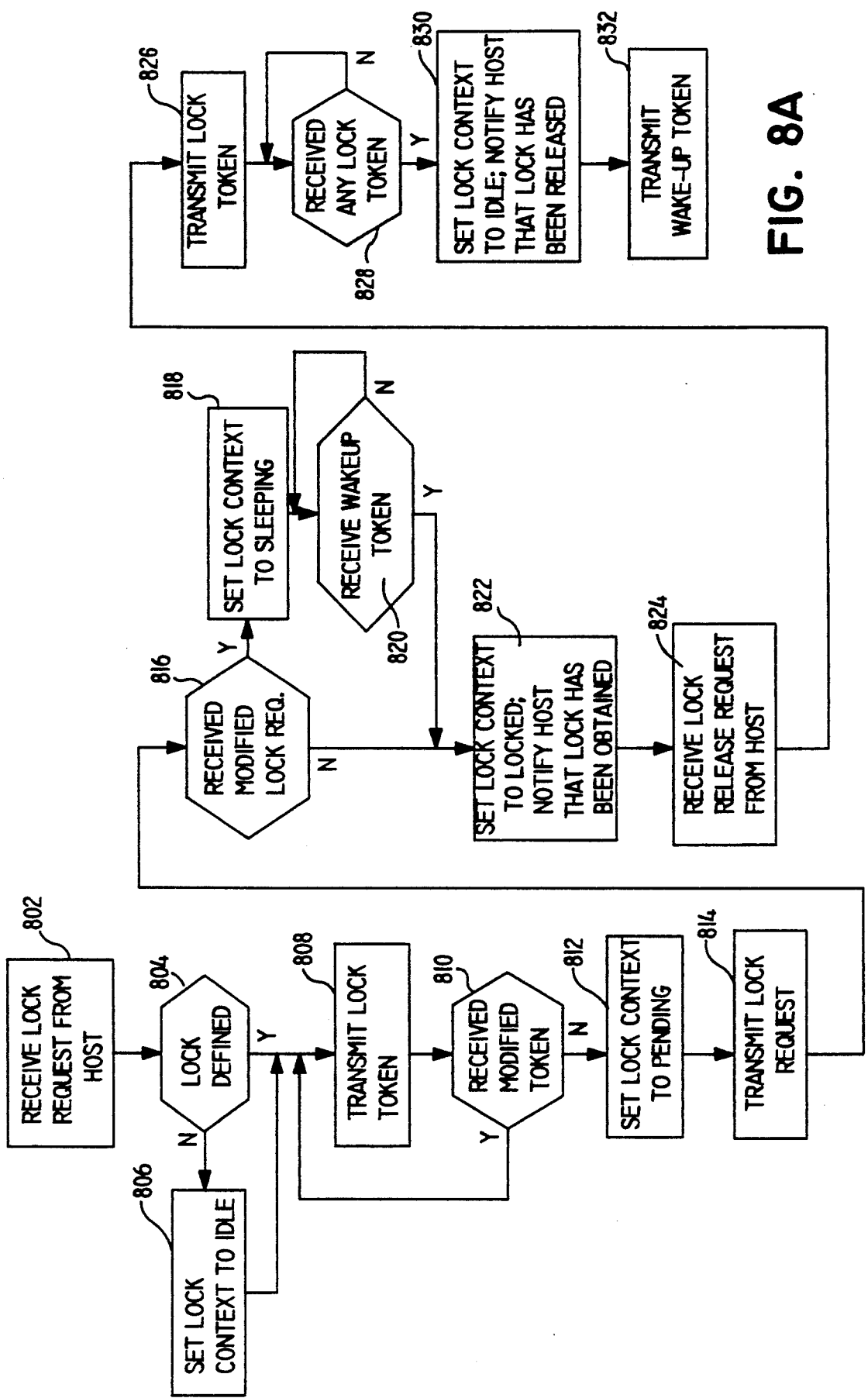
FIGS. 8a through 8g are flow-chart diagrams which illustrate the operation of an exemplary distributed resource locking system according to the present invention.

FIG. 8a is a flow-chart diagram which illustrates the normal control flow involved in grabbing and releasing a lock using the exemplary resource locking scheme. A resource lock request begins when, at step 802, one of the host processors requests a particular lock. In the exemplary embodiment of the invention, this request is made via a control channel (not shown) which is implemented with the data transfer channels between the host computer and the receive buffers 328.

When the node receives the request, it checks its CAM 222 to determine if an entry for the lock exists. If not, step 806 establishes an entry in one of the NULL records and sets the lock context (LC) for the node to IDLE. Since the locking system is distributed across the nodes, the state of any lock may only be determined by examining the lock context of each node.

At step 808, the control circuitry 214 conditions the lock packet generator 234 to send a LOCK TOKEN packet around the ring. If the node receives the LOCK TOKEN packet and it was modified as it traveled around the ring, as in step 810, the original sending node knows that other nodes are also in the process of making a request for the lock. In this case, the sending node re-transmits the LOCK TOKEN packet until the packet returns unmodified.

Once an unmodified LOCK TOKEN packet is received, the node, at step 812, adjusts the lock context to PENDING and, at step 814, transmits a LOCK REQUEST packet around the ring to gain the lock. If, at step 816, the LOCK REQUEST packet returns to the node modified then another node either has the lock or will imminently be given the lock. In this instance, the lock context is set to SLEEPING at step 818. Eventually, the node will receive a WAKEUP TOKEN packet, at step 820, indicating that the other node has released possession of the lock. The generation of a WAKEUP TOKEN packet is discussed below.

If the lock context was PENDING and an unmodified LOCK REQUEST packet is received or if the lock context was SLEEPING and a WAKEUP TOKEN packet is received then, in step 822, the node grabs the lock by updating the lock context in the CAM 222 to LOCKED. The node then sends the packet to the host. Under the exemplary scheme, the host has procured the lock and may then assume exclusive use of the resource.

The host computer sends a lock release request to the node at step 824 when the lock is to be released. This request is made via the control channel (not shown) in the data transfer channels between the host and the receive buffers 328. In response to this request, the node conditions the lock packet generator 234 to transmit a LOCK TOKEN packet around the ring at step 826. When the packet is returned to the node at step 828, with or without modification, the node, at step 830, sets the lock context to IDLE and sends the packet to the host to indicate that the lock is released. The node then transmits a WAKEUP TOKEN packet, at step 832, to awaken one of the nodes that may be waiting for the lock.

FIG. 8a describes a typical flow for grabbing and releasing a lock. This is accomplished using multiple state machines. Each of the relevant state machines is described below with reference to FIGS. 8b through 8f.

Figure 8B:
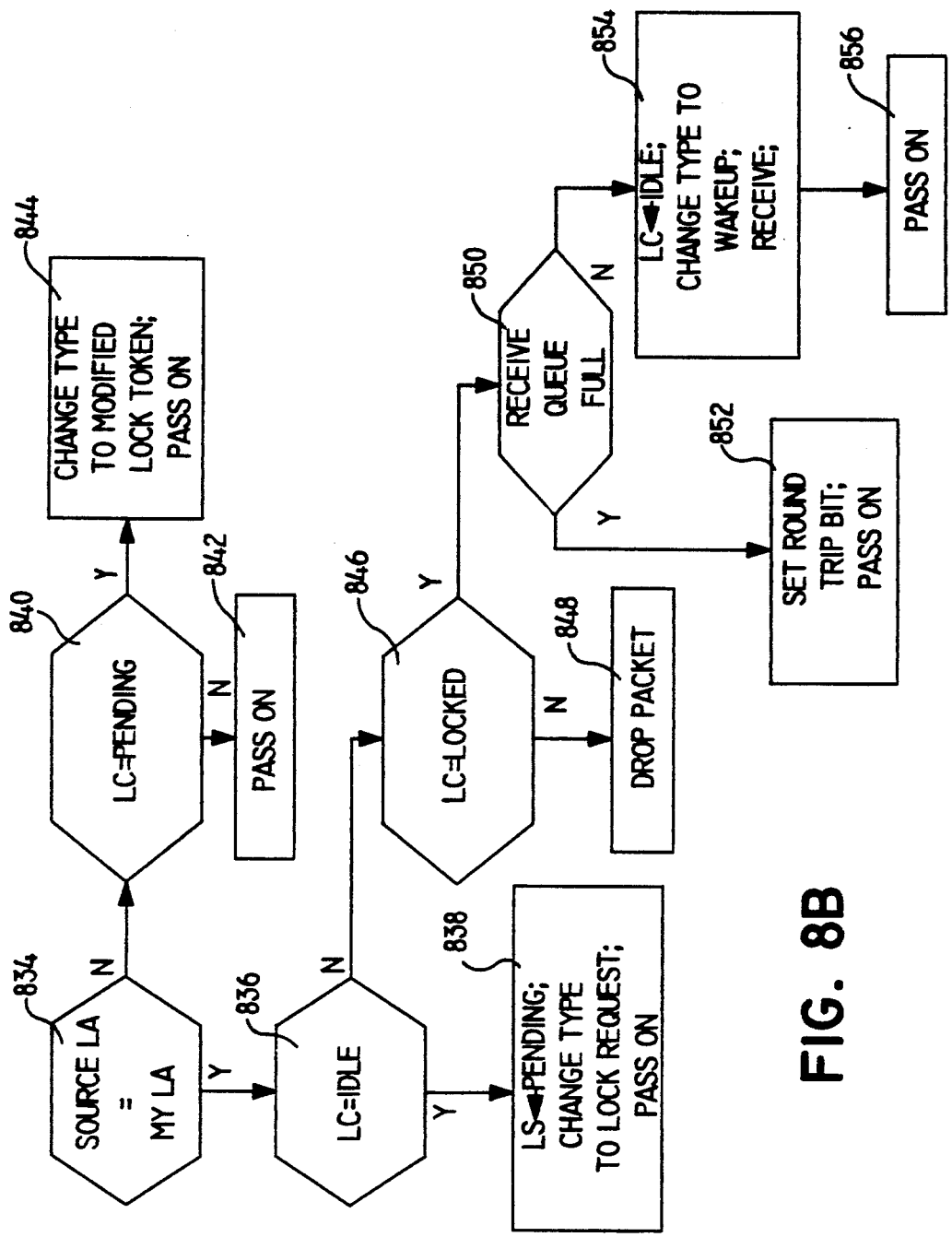

FIG. 8b concerns the steps taken by a node operating under control of a HANDLE LOCK TOKEN state machine upon receipt of a LOCK TOKEN packet from the ring. If, at step 834, the SOURCE LA of the packet matches MY LA, then this node originally transmitted the packet. In this instance, the state machine proceeds, at step 836, to test the current lock context in the CAM 222. An IDLE lock context, at step 838, indicates that this node is attempting to request the lock. If so, the state machine changes the lock context in the CAM 222 to PENDING to indicate to the other nodes that this node will attempt to procure the lock. The state machine then changes the type of the packet to a LOCK REQUEST packet using the modify register 216 and sends the packet back onto the ring to gain the lock.

If, at step 836, the state machine finds that the lock context is not IDLE but is instead LOCKED, at step 846, the state machine attempts to receive the packet into the receive queue 226. This state occurs when the host has requested that the lock be released. Since the lock can now be released by the node, the host should be notified. If the receive queue is full, at step 850, then the host cannot be notified. Here, at step 852, the state machine sets the round-trip bit (R) and retransmits the packet onto the ring to wait for space to become available in the receive queue 226.

If the receive queue is not full in step 850, the state machine releases the lock at step 854. To do this, the state machine sets the lock context in the CAM 222 to IDLE, changes the packet type to WAKEUP using the modify register 216 and notifies the host that the lock has been released by receiving the packet into the receive queue 226. By passing the WAKEUP TOKEN packet onto the ring, at step 856, the state machine reawakens another node that may be have been waiting (i.e. LC = SLEEPING) for the lock to be released. The packet is deleted at step 848 if the node is not grabbing or releasing the lock; this is an error condition and should not occur in the normal operation of the network.

When, at step 834, the SOURCE LA of the LOCK TOKEN packet is not the loop address of the node, the state machine checks, at step 840, the lock context in the CAM 222 to determine if this node is also interested in the lock (i.e. if LC=PENDING). If so, at step 844, the state machine changes the packet type to MODIFIED LOCK TOKEN and transmits the packet back onto the ring to notify the source node that this node is interested in the lock. If, at step 840, the node is not interested in the lock, the state machine simply transmits the packet to the next node in step 842.

Figure 8C:
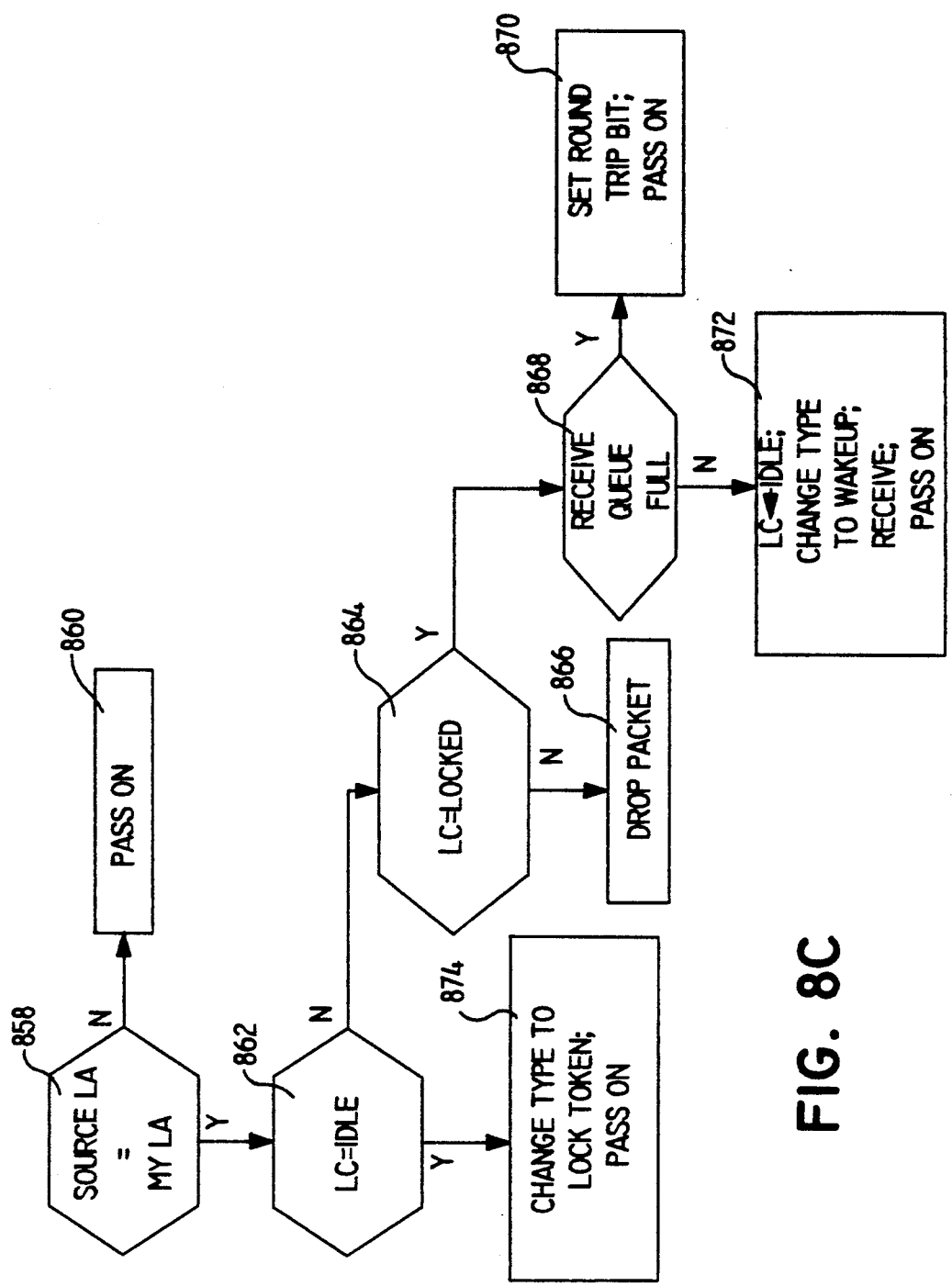

FIG. 8c illustrates the operation of the HANDLE MODIFIED LOCK TOKEN state machine, which controls the node when a MODIFIED LOCK TOKEN packet is received. If, at step 858, the SOURCE LA of the received packet matches MY LA, then this node generated the LOCK TOKEN packet which became a MODIFIED LOCK TOKEN packet. In this instance, a node lock context of IDLE, at step 862, indicates that this node along with at least one other node is interested in the gaining the lock. At step 874, the state machine changes the packet type back to LOCK TOKEN and retransmits the packet back onto the ring. The state machine then transmits this packet back onto the ring, waiting to become the only node interested in procuring the lock.

If, at step 862, the lock context at the node is not IDLE but is, at step 864, LOCKED, the state machine is attempting to release the lock. Here, the host should be notified that the lock has been successfully released. Since a MODIFIED LOCK TOKEN packet was received, there must be another node interested in procuring the lock. When the receive queue is full at step 868, the state machine cannot notify the host. In this instance, the state machine, at step 870, sets the packet round-trip bit (R) and transmits the packet back onto the ring to allow time for space to become available in the receive queue.

At step 872, the receive queue is not full so the lock can be released. The state machine, at this step, sets the lock context in the CAM 222 to IDLE and changes the packet type to a WAKEUP TOKEN packet using the modify register 216. The state machine transmits the packet to the host through the receive queue 222 as notification of the release. In addition, the state machine passes the packet on the ring through the pass through FIFO 228 and output state machine 230 to notify any node for which the lock context is SLEEPING, if there is such a node, that the lock has been released. At step 866, the state machine deletes the packet if the lock context indicates no attempt at a grab or release of the lock. This is a condition that should not occur in normal operation of the network.

Should the SOURCE LA of the packet not match MY LA at step 858, the packet is simply passed on at step 860. Even if the node is interested in gaining the lock, another node already changed the packet type to show interest in the lock.

Figure 8G:
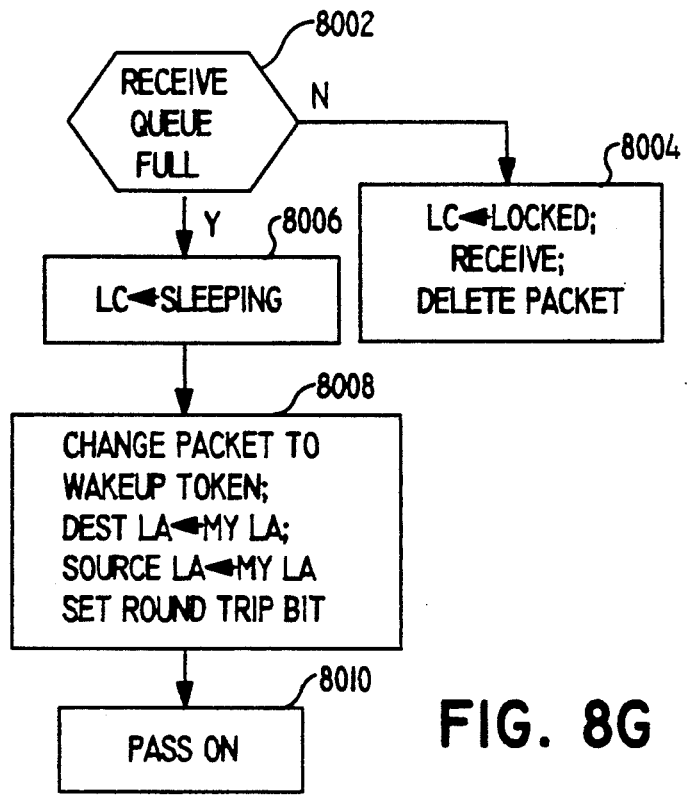
Figure 8D:
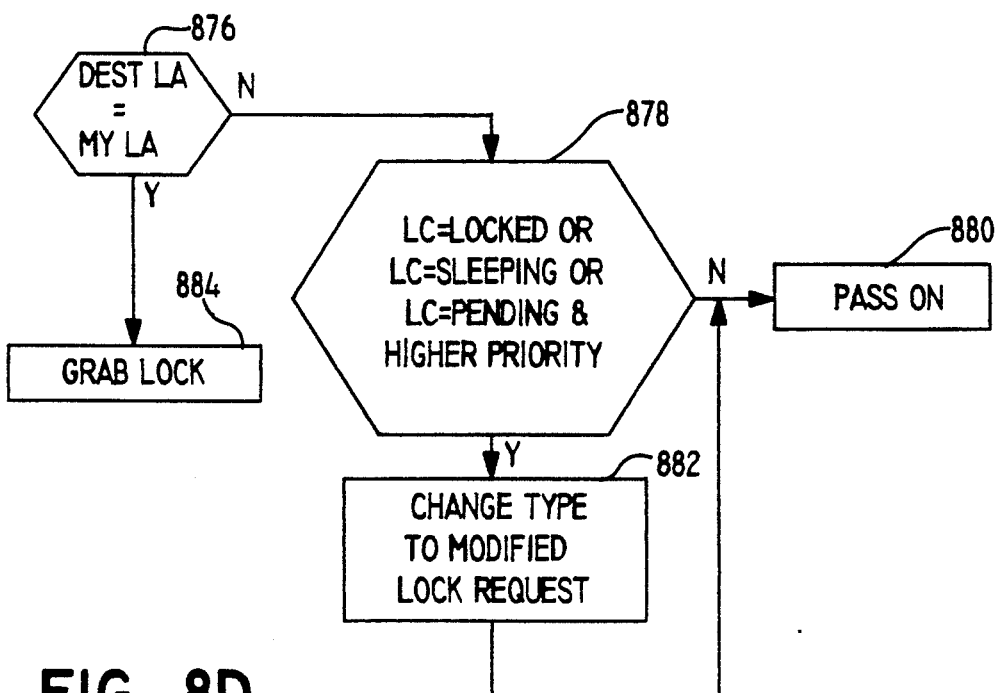

The flow-chart diagram in FIG. 8d illustrates the operation of the HANDLE LOCK REQUEST state machine, which controls the node when a LOCK REQUEST packet is received. If, in step 876, the destination loop address (DEST LA) of the packet matches MY LA, then this node is trying to grab the lock. Since the packet returned unmodified, no other node has grabbed the lock, is sleeping, waiting to procure the lock, or is interested in procuring the lock and has higher priority. In this instance, at step 884, the state machine attempts to grab the lock. The flow-chart in FIG. 8g, described below, diagrams the grab lock operation.

When, at step 876, the node did not originally transmit the received packet, the state machine, at step 878, determines if the packet should be modified based on the lock context. Step 882 modifies the packet if the lock is already allocated (lock context is LOCKED), the node is waiting for another node to release the lock (lock context is SLEEPING), or the node is a higher priority and is waiting for return of a LOCK TOKEN packet that it generated (lock context is PENDING and higher priority). In all cases, the state machine transmits the packet on the ring at step 880. In the exemplary embodiment of the invention, node priority is arbitrarily assigned based on by the node loop address. The higher the node loop address, the higher the priority. It is contemplated that other priority schemes may be used.

Figure 8E:
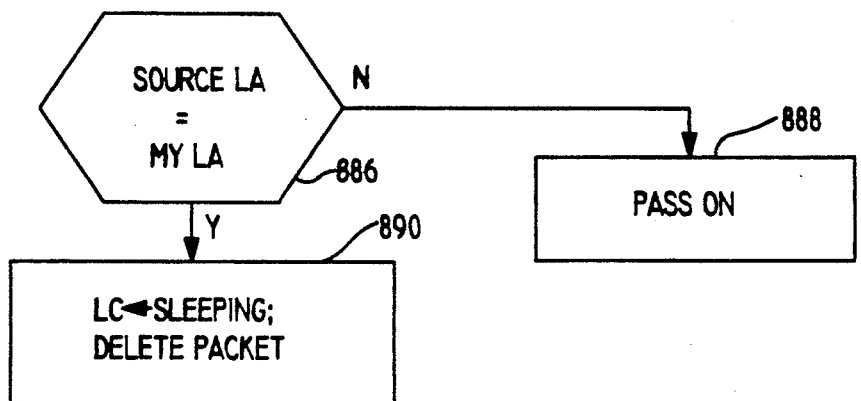

FIG. 8e diagrams the node operation upon receipt of a MODIFIED LOCK REQUEST packet from the ring. This flow-chart diagram illustrates the operation of the HANDLE MODIFIED LOCK REQUEST state machine. If, at step 886, the SOURCE LA of the packet is MY LA, then this node originally transmitted the packet as a LOCK REQUEST packet. In this instance, another node modified the packet since this node was not entitled to the lock at this time. This operation is explained above at step 878 of FIG. 8d. Here, at step 890, the state machine changes the lock context to SLEEPING and deletes the packet. The node lock context stays SLEEPING until a WAKEUP TOKEN packet is received from the ring.

If, at step 886, the node did not originally transmit the LOCK REQUEST packet, the packet is simply passed on the ring. The packet is already modified so the state machine has no need to check node lock context and possibly modify the packet.

Figure 8F:
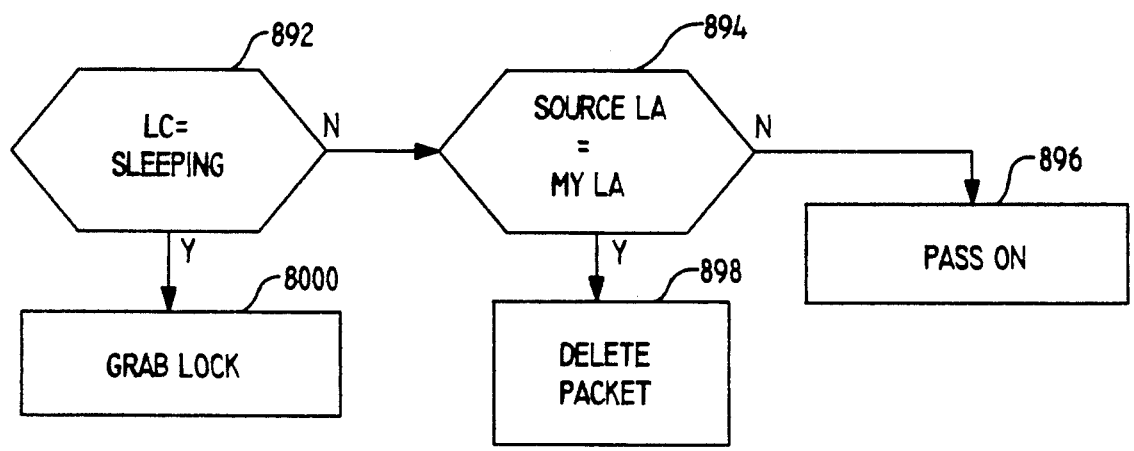

FIG. 8f concerns the HANDLE WAKEUP TOKEN state machine which controls the steps taken by the node when a WAKEUP TOKEN packet is received from the ring. If, at step 892, the lock context of the node is SLEEPING, the state machine attempts to grab the lock by invoking the GRAB LOCK state machine at step 8000. The GRAB LOCK state machine is described below with respect to FIG. 8g. Otherwise, at step 894, if the SOURCE LA of the packet matches MY LA, then this node originally transmitted the WAKEUP TOKEN packet. In this instance, the state machine deletes the packet at step 898 since no other node had a lock context of SLEEPING for the lock. If, at step 894, the node did not originally transmit the packet, the packet is passed onto the ring.

FIG. 8g illustrates the GRAB LOCK state machine. Here, the lock is available since an appropriate packet has been received, but the host has not been notified. If, at step 8002, the receive queue is not full, the state machine, at step 8004, changes the lock context to LOCKED, receives the packet, to notify the host, and deletes the packet. Under the exemplary scheme, the host assumes exclusive use of the resource controlled by the lock.

Alternately, if, at step 8006, the receive queue is full, the state machine does not grab the lock, since its host is unable to receive a message indicating that the lock has been procured. In this instance, the state machine changes the lock context to SLEEPING, at step 8006. In step 8008, the state machine changes the packet type to a WAKEUP TOKEN packet, sets the SOURCE LA and DEST LA to MY LA and sets the round-trip bit (R). The state machine then sends the changed packet at step 8010 thereby giving other SLEEPING nodes an opportunity to procure the lock, or giving this node time to empty at least one packet from its receive queue.

The resource locking scheme described above with reference to FIGS. 8a through 8g as being implemented in hardware on a ring network can be implemented in software, without specialized hardware, on other physical types of networks. In addition, it is contemplated that the scheme can protect many contentious resources on a single network such as a database, a non. spooling printer and a plotter.

In this alternative embodiment, the scheme can be embedded in an application program or integrated into a custom transport protocol layer for the network. In the application program embodiment, the program executes with a reliable transport protocol (e.g. transmission control protocol/internet protocol (TCP/IP)). In the custom transport protocol embodiment, the exemplary resource locking scheme is fully integrated into the transport protocol layer of the network.

The custom transport protocol embodiment may be more efficient because it combines all of the application program functions and the transport protocol functions into a single transport protocol. It also provides the easiest method for integrating sophisticated error reporting functions into the network. Note that the following discussion describes the application program embodiment, but all of the described functions can be integrated into the custom transport protocol embodiment.

In the contemplated alternative embodiment, the reliable transport protocol ensures that messages will not be lost, duplicated or received out of order while the application program provides queuing of incoming messages so that the order of the messages is preserved. The application program on each node sends messages to a pre-defined downstream node and receives messages from a pre-defined upstream node. Once all the participating nodes have made these predetermined connections, they form a unidirectional logical loop on the network. In this embodiment of the invention, each node participating in the scheme runs the application program. Non. participating nodes never attempt to access the contentious resource.

The exemplary embodiment represents all five resource locking packet types in a single LOCKING MESSAGE. LOCK TOKEN, MODIFIED LOCK TOKEN, LOCK REQUEST, MODIFIED LOCK REQUEST and WAKEUP are indicated in a type field in the LOCKING MESSAGE. A source address field in the LOCKING MESSAGE provides a method for the node to determine which node originated the message. In addition, the LOCKING MESSAGE provides a resource identifier field (i.e. LOCK ID) to use the exemplary scheme when the system contains multiple contentious resources. In this case, each resource in the network is assigned a unique resource identifier value.

It is contemplated that the alternative embodiment resolves simultaneous locking requests with an agreed upon priority algorithm. Under this scheme, a unique priority value is assigned to each node in the system. The priority value can be a network address, such as a partial internet protocol (IP) address, or a network hardware address, such as an Ethernet address. The agreed upon algorithm can be as simple as giving priority to a higher address value over a lower value.

In this alternative embodiment, the functions performed by the node state machines are implemented in the application programs running at the participating nodes of the alternative network. Each application program maintains a lock context (LC) for each defined resource identifier. All of the previously described lock contexts (i.e. IDLE, LOCKED, PENDING and SLEEPING) found in the CAM 222 are implemented in the application program of this embodiment.

In this alternative embodiment, a process that needs a contentious resource requests a lock from the application program and waits for the application program to indicate that the lock has been procured. Once the process has been notified, it has exclusive use of the resource. No other process may access the resource until the lock is released. After the process has completed use of the resource, it frees the lock by notifying the application program.

It is contemplated that the software resource locking scheme can be integrated directly into the software process managing the contentious resource (i.e. a printing process). In this way, the managing process can limit the use of the resource, detect errors and provide error recovery in addition to the exemplary locking scheme.

This alternative embodiment can be modified to ensure proper initialization of all nodes by adding an INIT TOKEN message. The INIT TOKEN message is transmitted by a node after the node connections to the predefined upstream and downstream node have been established. These logical connections are established by operator intervention, by executing a dedicated set-up routine or through the underlying physical network. In any case, the node begins the exemplary initialization scheme by setting the initialization context to PENDING and transmitting the INIT TOKEN message onto the network.

When a node receives the INIT TOKEN message, it determines if it is the source of the message. If so, the node deletes the message and sets the initialization context to IDLE to indicate that all nodes in the logical loop have completed initialization. If the node did not originate the INIT TOKEN message, the node attempts to transmit the message to the next predefined downstream node. When a node cannot transmit a message, perhaps due to a missing connection, the it simply deletes the message.

In this alternative embodiment, the originating node of the INIT TOKEN message allows time for the message to be returned. If the message does not return within the allotted time, another node may have deleted the message. In this instance, the originating node retransmits the INIT TOKEN message onto the network.

It is possible under the exemplary scheme that several INIT TOKEN messages from one node may be on the network at the same time, the multiple message presents no problem since a node considers initialization complete as soon as one message returns (initialization context=IDLE). After this point, a node that receives another INIT TOKEN simply deletes the message from the network.

Once the logical ring configuration is established, the locking scheme is implemented as set forth above with reference to FIGS. 8a through 8g, where each of the state machines are implemented as programmed functions in the custom transport protocol.

The contemplated alternative embodiment can be modified in yet another way. This modification provides a method for nodes to be added and removed from the logical loop network after the system has been initialized. The scheme adds a RECONFIG TOKEN message to notify a node of a change in the upstream or downstream node.

In this alternative embodiment, a node that has no locks allocated may remove itself from the network by transmitting a RECONFIG TOKEN message. The node stores the loop address of the downstream node in the RECONFIG TOKEN message and sends the message to the upstream node. Under the exemplary scheme, the downstream node becomes the new downstream node of the node that receives the RECONFIG TOKEN message.

When the upstream node receives the message, it disconnects the connection to the downstream node that sent the RECONFIG TOKEN message. A logical connection is modified, that is connected or disconnected, by operator intervention or through the underlying physical network. After the disconnect, the upstream node attempts to connect to the node indicated in the RECONFIG TOKEN message.

During this time, the node leaving the network finishes processing all messages in its message queue and disconnects from the logical ring. It is only after the leaving node disconnects, that the upstream node is able to connect to the node indicated in the RECONFIG TOKEN message. After the connection is made, the network logical loop reconfiguration is again complete. The upstream node deletes the RECONFIG TOKEN message and sends all future messages to its new downstream node.

In this alternative embodiment, a node may be added to the network by using the RECONFIG TOKEN message as well. Under the exemplary scheme, the node which is upstream of the node to be added disconnects from its downstream node. Next, the upstream node connects to the node to be added so that the added node is now the downstream node. At this point, the upstream node stores the loop address of the old downstream node in the RECONFIG TOKEN message and sends the message to the new node.

When the new node receives the RECONFIG TOKEN message, it attempts to connect to the node indicated in the message. After this connection is made, the logical loop reconfiguration is complete with the new node added to the network. The new node then deletes the RECONFIG TOKEN message.

It is also contemplated that a resource lock could be used to control the orderly addition and removal of nodes using the RECONFIG TOKEN message scheme described above. The lock provides a method to ensure that multiple changes in the network logical loop configuration do not occur at the same time. It is contemplated that the lock could be grabbed by a node, using the exemplary resource locking scheme, before the reconfiguration process begins. After reconfiguration is completed, the node would then release the lock.

It is further contemplated that reconfiguration of the network can be facilitated through the underlying physical network. The scheme uses broadcast messages available on many networks to announce the nodes that are part of the network logical loop. The new node to be added to the logical loop uses the broadcast message from the first responding node as its upstream node. Using the RECONFIG TOKEN message scheme described above, the new node is inserted in the logical loop after the first responding node.

Figure 9A:
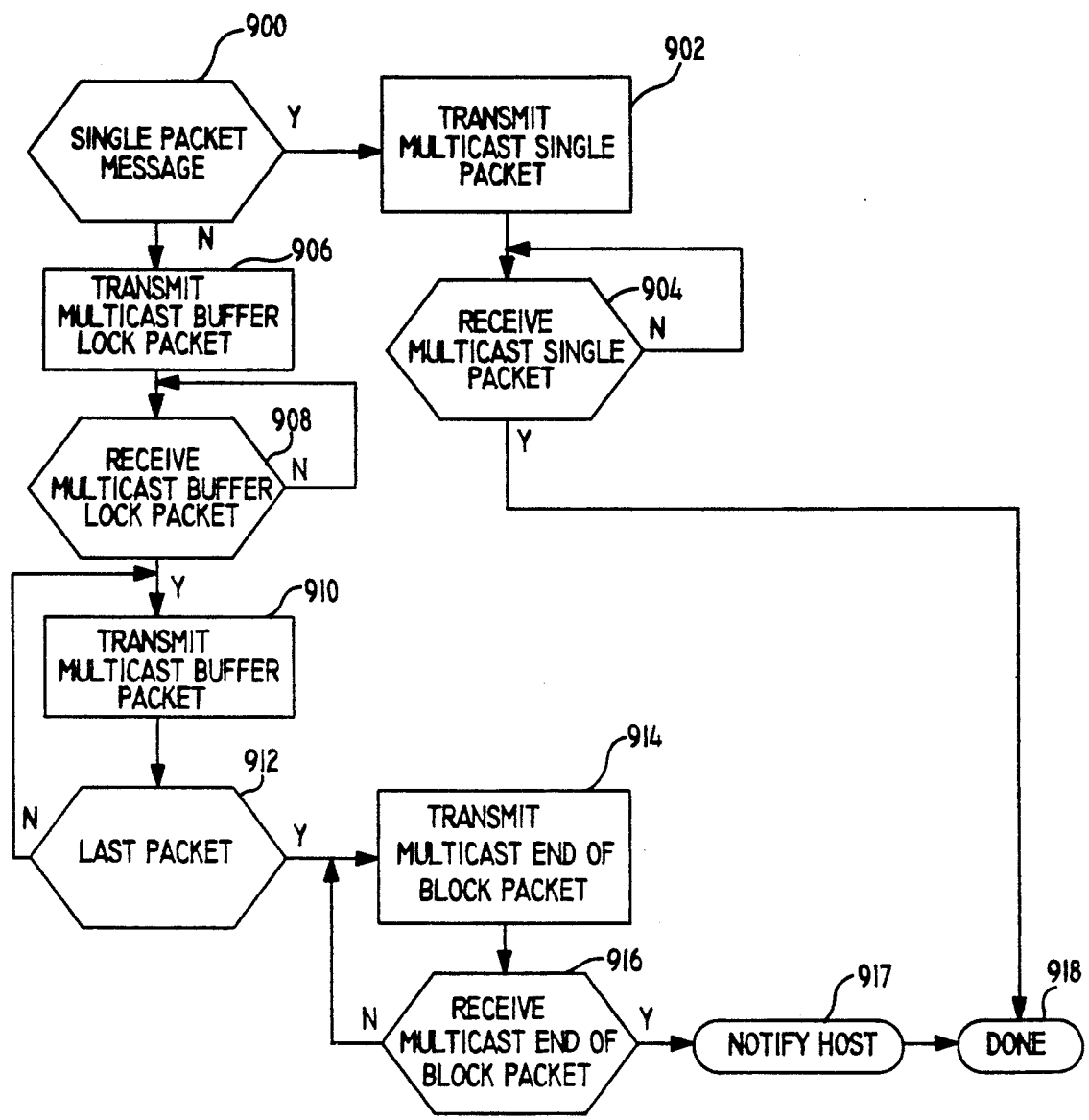

FIGS. 9a through 9j concern a multicasting system which uses the embodiment of the invention described above with reference to FIGS. 1-7b. FIG. 9a is a flowchart which illustrates the normal control flow involved in transmitting a multicast message using the exemplary multicast system. The transmission process begins at step 900 when the host requests that a multicast message be sent. If, at step 900, the entire message can be transmitted in a single packet, the node, at step 902, transmits the MULTICAST SINGLE packet request from the host without using the exemplary buffer lock scheme described below. In this instance, at step 904, when the originating node receives its own MULTICAST SINGLE packet, the multicast message transmission has been completed.

When the message, at step 900, cannot be contained in a single packet, the host breaks the message to fit into one or more MULTICAST BUFFER packets and one MULTICAST END OF BLOCK packet. In this case, the host first transmits, at step 906, a MULTICAST BUFFER LOCK packet to cause the other nodes in the multicast group to pre-allocate a buffer to receive the message. This is a short packet which is sent by the host onto the loop via the transmit queue 232 and output state machine 230 of the node. In response to this packet, the other nodes in the multicast group (i.e. those having the SOCKET ID of the multicast buffer socket in their CAM's) allocate a buffer to receive the message and then pass the MULTICAST BUFFER LOCK packet back onto the ring. Once the MULTICAST BUFFER LOCK packet returns on the ring to the originating node, at step 908, all receiving multicast nodes in the group have a buffer allocated for the message. That is to say, that the message has been transmitted and that it has been received by all members of the multicast group.

It is contemplated that the size of the buffer will either be established by convention among the members of the group or encoded in the parameter field of the packet. The node begins sending the MULTICAST BUFFER packet at step 910. The MULTICAST BUFFER packet is used to pass the message until the last packet is ready to be sent at step 912. Here, at step 914, the MULTICAST END OF BLOCK packet is sent by the node to indicate the end of the multicast message. When the MULTICAST END OF BLOCK packet is returned to the node unmodified, at step 916, all multicast nodes in the group have received the message. At step 917, the host is then notified that the message has been received.

For each of the multicast packet types, there is a corresponding REQUEST type (e.g. MULTICAST SINGLE PACKET and REQUEST MULTICAST SINGLE PACKET). A packet is converted into its corresponding REQUEST type if one member of the multicast group cannot receive the packet.

Figure 9B:
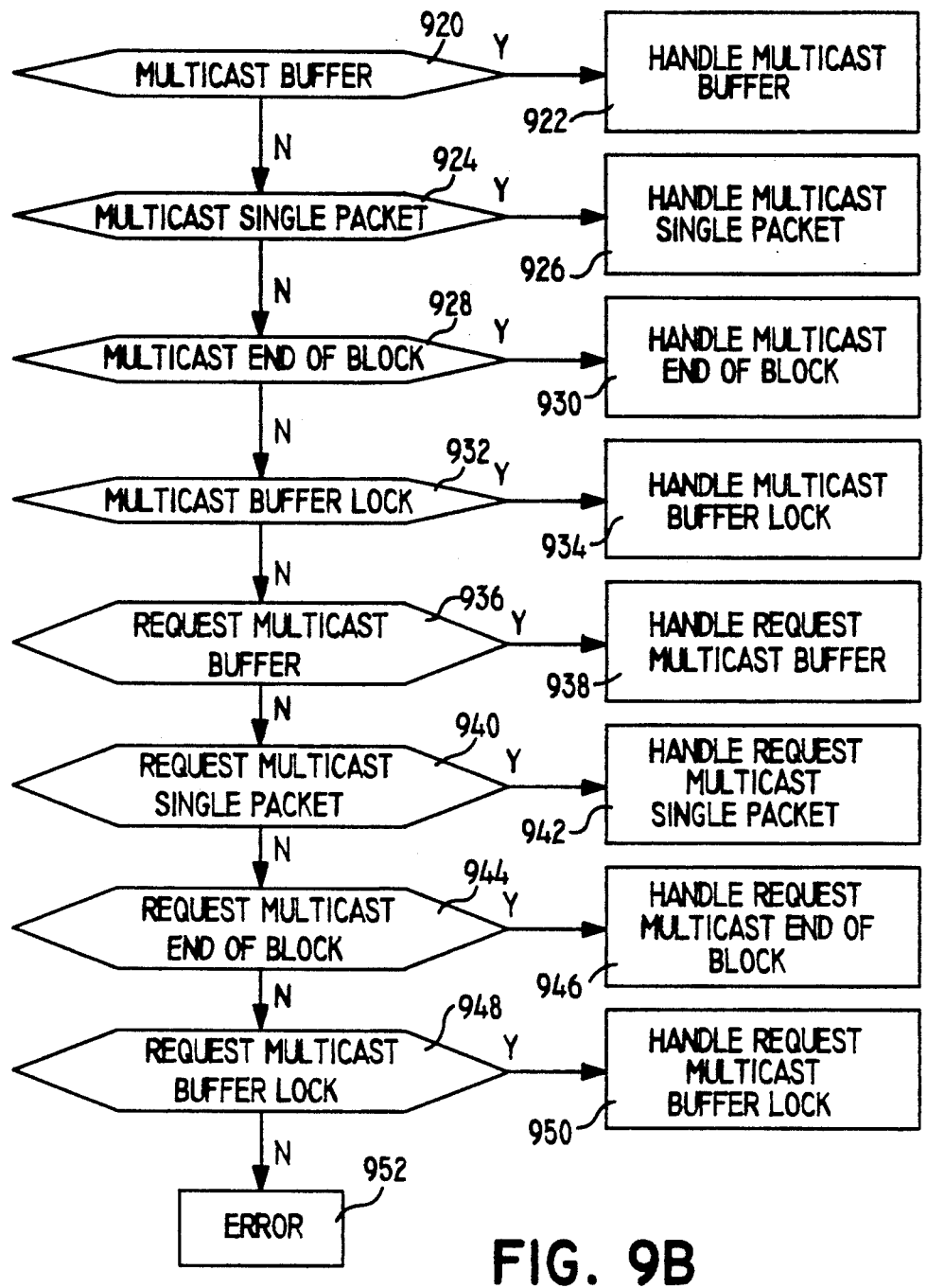

FIG. 9a describes a typical flow for transmitting a multicast message using the exemplary multicast system. FIG. 9b shows the multiple state machines used to implement the exemplary scheme. The FIGURE shows the state machines which are activated by the control circuits upon receipt of each type of multicast packet. FIGS. 9c through 9j together with the following discussion, further outline the processing of the state machines in FIG. 9b.

Figure 9C:
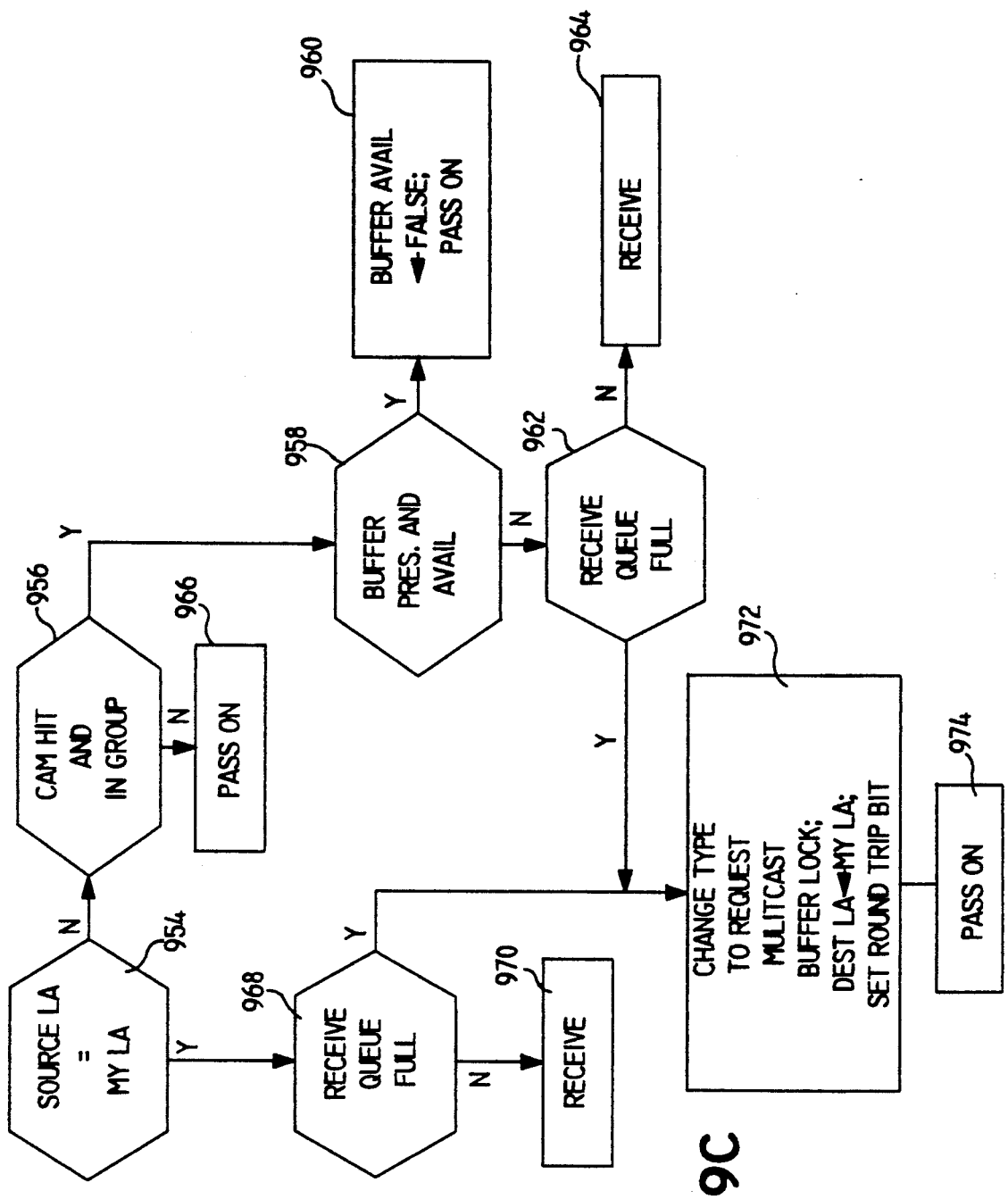

The flow-chart diagram in FIG. 9c illustrates the node operation upon receipt of a MULTICAST BUFFER LOCK packet from the ring. If, at step 954, the SOURCE LA of the packet is MY LA, then this node originally transmitted the packet. In this instance, all nodes in the group have allocated a buffer in anticipation of a multiple packet message, but the host has not been notified that the packets can now be sent. If, at step 968, the receive queue 226, shown in FIG. 2, is not full, the host can be notified, at step 970, by receiving the packet.

Alternatively, if the receive queue is full at step 968, the node allows time for space to become available in the queue by sending the packet around the ring again. In this instance, at step 972, the HANDLE MULTICAST BUFFER LOCK state machine uses the modify register 216 to change the packet type to REQUEST i MULTICAST BUFFER LOCK, adjusts the destination loop address (DEST LA) to MY LA and sets the round-trip bit (R), also using the modify register 216. In step 974, the state machine sends the packet onto the ring through the pass-through FIFO 228.

If this node did not originally transmit the MULTICAST BUFFER LOCK packet at step 954, the state machine, at step 956, determines if it is to receive the ensuing multicast message. Here, at step 956, the state machine checks the CAM 222 to determine if the SOCKET ID in the packet matches a GROUP ID in the CAM 222 (CAM HIT) and if the CAM entry indicates that this node is in the group (IN GROUP). If not, the packet is passed onto the ring at step 966 since the node is not included in the multicast.

If the node is included in the multicast group, at step 956, the state machine attempts to allocate the multicast buffer. At step 958, the state machine determines if the buffer is both present and available for use (BUFFER PRES. and AVAIL). If the test at step 958 is satisfied, the state machine can allocate the buffer for the upcoming MULTICAST BUFFER packet by simply marking the buffer as being no longer available and passing the packet onto the ring at step 960.

When the buffer is unavailable at step 958, the state machine attempts to notify the host of the condition. This gives the host an opportunity to free the buffer or to allocate a new buffer. The host is notified, at step 964 by receiving the packet, if, at step 962, the receive queue is not full. In the event that the receive queue is full, at step 962, the node sends the packet around the ring to allow time for space to become available in the queue or for the buffer to become available. By changing the packet type to REQUEST MULTICAST BUFFER LOCK, replacing the destination loop address (DEST LA) with MY LA, and setting the round-trip bit (R), the node, at step 972, ensures that the packet will return from the ring at a later time. At step 974, the packet is retransmitted onto the ring.

In multicast transactions, the round-trip bit provides redundant information since it is only set for REQUEST packet types. Unless it is to receive the packet, a node should retransmit any packet having a REQUEST type irrespective of the state of its round trip bit. In this embodiment of the invention, however, the round-trip bit is used to simplify the various state machines. A single shared test to determine whether a packet should be deleted or transmitted back onto the network may be more efficiently implemented than a number of individual tests which cannot be shared.

Figure 9D:
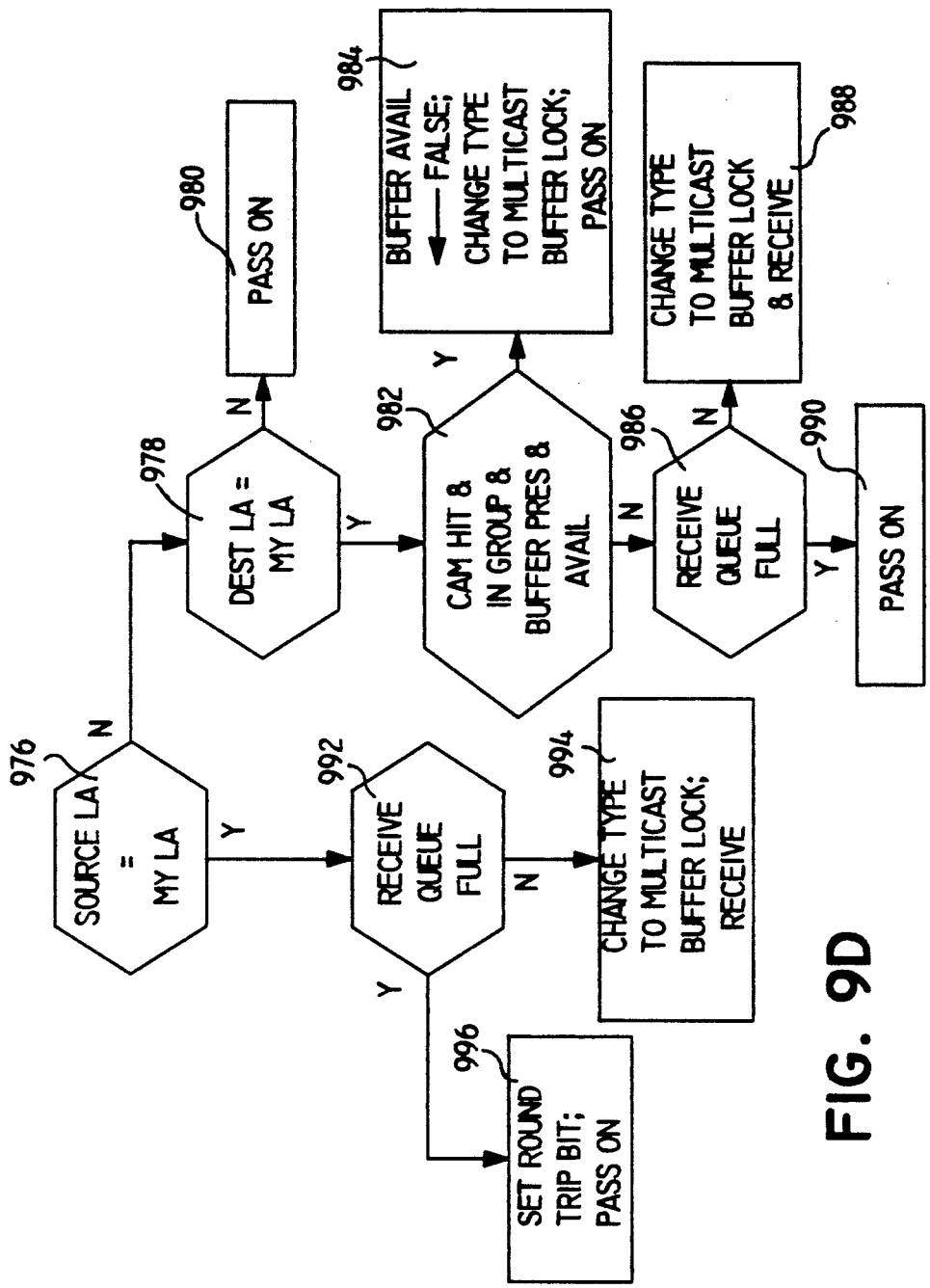

FIG. 9d concerns the steps taken by a node upon receipt of a REQUEST MULTICAST BUFFER LOCK packet (i.e. operating under control of the HANDLE REQUEST MULTICAST BUFFER LOCK state machine). When the SOURCE LA of the packet matches MY LA at step 976 then this node originally transmitted the MULTICAST BUFFER LOCK packet, but the node was unable to notify the host earlier that the packet had returned. If, at step 992, the receive queue is not full, the host can now be notified. The state machine changes the packet type back to MULTICAST BUFFER LOCK and receives the packet for the host.

A full receive queue, at step 992, causes the state machine to retransmit the packet back onto the ring to wait for space to become available in the queue. At step 996, the state machine sets the round-trip bit (R) and retransmits the packet.

When, at step 976, the node did not originally transmit the packet, the state machine, at step 978, checks the destination loop address (DEST LA) to determine if the node transmitted the packet to itself. In this instance, the node was either waiting for the multicast buffer to become usable or waiting for the receive queue to have room to receive the message for the host. At step 982, the state machine verifies that the packet is directed to this node (CAM HIT and IN GROUP) and checks that the multicast buffer is usable (BUFFER PRESENT and AVAILABLE). If all conditions are met at step 982, the state machine, at step 984, changes the buffer flag to unavailable, changes the packet type back to MULTICAST BUFFER LOCK and retransmits the packet back onto the ring.

At step 986, the state machine could not allocate the multicast buffer. Here, the state machine notifies the host to allow the host to free or allocate a buffer. If, at step 986, the receive queue is full, the state machine cannot notify the host. The state machine, at step 990, transmits the packet back onto the ring to wait for the host to free the buffer space by itself or for space to become available in the receive queue by passing the packet. If the host can receive the packet at step 986, the state machine changes the packet type back to MULTICAST BUFFER LOCK and receives the packet at step 988.

Figure 9E:
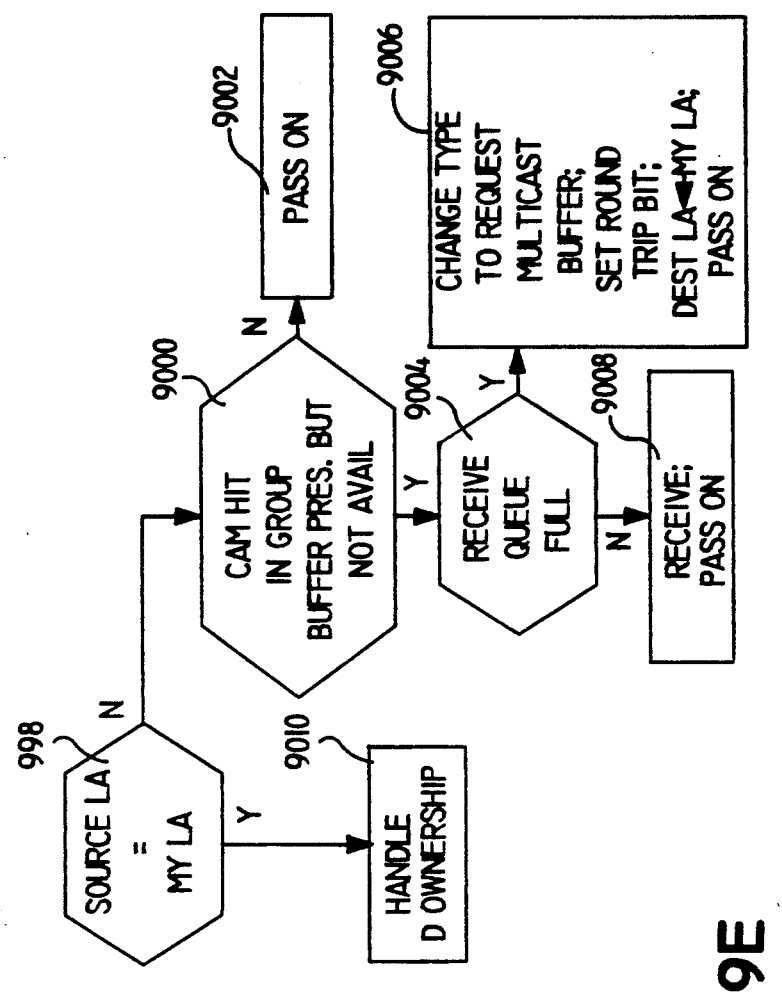

FIG. 9e illustrates the opera ion of the node when a MULTICAST BUFFER packet is received, that is to say, under the control of the REQUEST MULTICAST BUFFER state machine. When, at step 998, the SOURCE LA of the packet matches MY LA, this node generated the packet, so this packet indicates that all nodes in the multicast have received the packet. At step 9010, the state machine invokes the HANDLE D OWNERSHIP operation to delete the packet unless it is an owned packet which is needed. The HANDLE D OWNERSHIP function is described above with reference to FIG. 6b.

If, at step 998, the node did not originate the packet, the state machine determines, at step 9000, if it is to receive the packet and if it is ready to do so. When there is a CAM HIT (i.e. SOCKET ID =GROUP ID) and the node is IN GROUP, the node is a member of the multicast group. Provided the node received the earlier MULTICAST BUFFER LOCK packet, the state machine should find the multicast buffer present, but not available at step 9000.

The state machine, at step 9002, transmits the packet back onto the ring if any condition in step 9000 is not met. Alternately, if all conditions at step 9000 are met, the state machine attempts to receive the multicast packet for the host. In this instance, the state machine checks the receive queue at step 9004. If the receive queue is not full, the state machine, at step 9008, both receives the MULTICAST BUFFER packet and passes it back onto the network. Should the queue be full at step 9004, the state machine transmits the packet back onto the ring to allow time for space to become available in the queue. Here, at step 9006, the state changes the packet type to REQUEST MULTICAST BUFFER, sets the round-trip bit (R), adjusts the destination loop address (DEST LA) to MY LA and retransmits the packet back onto the ring.

Figure 9F:
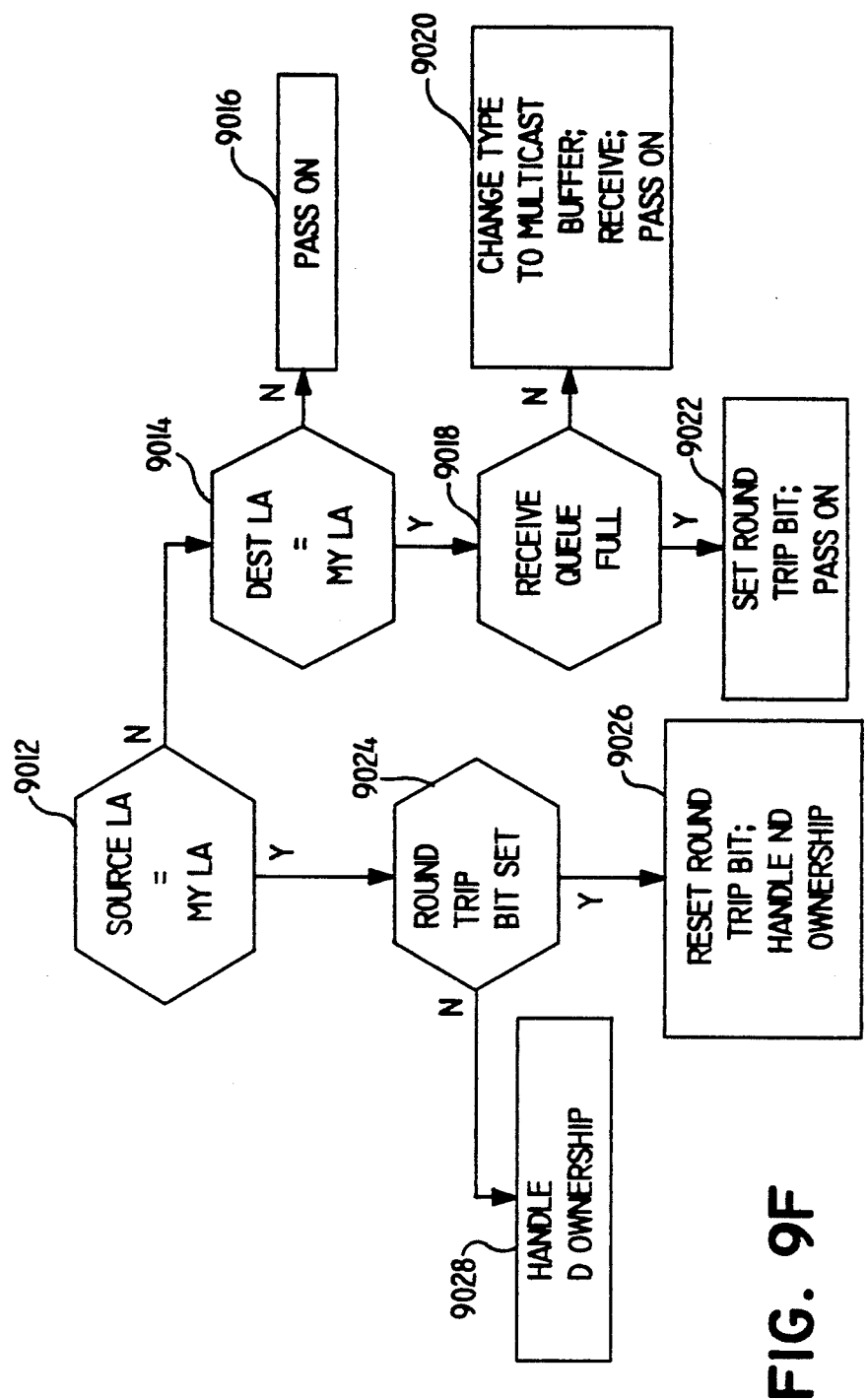

FIG. 9f illustrates the operation of the node when a REQUEST MULTICAST BUFFER packet is received. If, at step 9012, the SOURCE LA in the packet is MY LA, the node originated the MULTICAST BUFFER packet. In this instance, the HANDLE REQUEST MULTICAST BUFFER state machine checks the round-trip bit (R) of the packet at step 9024. A set round-trip bit indicates that the packet was sent around the ring by a node which was designated to receive the multicast packet but, perhaps due to a full receive queue, the node could not receive the packet. Here, at step 9026, the state machine resets the round-trip bit (R) and invokes the HANDLE ND OWNERSHIP operation described above with reference to FIG. 6a.

If the round-trip bit, at step 9024, is not set, the state machine removes the packet since it is an error condition. To remove the packet, the state machine invokes the HANDLE D OWNERSHIP operation at step 9028.

When the node did not originate the REQUEST MULTICAST BUFFER packet (SOURCE LA is not MY LA), at step 9012, the state machine examines the destination loop address to determine if the node sent the packet to itself (DEST LA is MY LA). In this instance, the node could not receive an earlier MULTICAST BUFFER packet due to a full receive queue. If, at step 9018, the receive queue is no longer full, the state machine, at step 9020, changes the packet type back to MULTICAST BUFFER, receives the packet for the host and transmits the packet onto the ring to be received by the next node.

When, at step 9018, the receive queue 226 is still full, the node allows more time for space to become available in the queue by passing the packet around the ring once again. At step 9022, the node sets the round-trip bit and retransmits the packet back onto the network.

Nodes that receive packets having a destination loop address (DEST LA) which does not match MY LA, at step 9014, simply retransmit the packets back onto the network at step 9016. Here, another node is waiting until its receive queue is no longer full so that it can receive the packet.

Figure 9G:
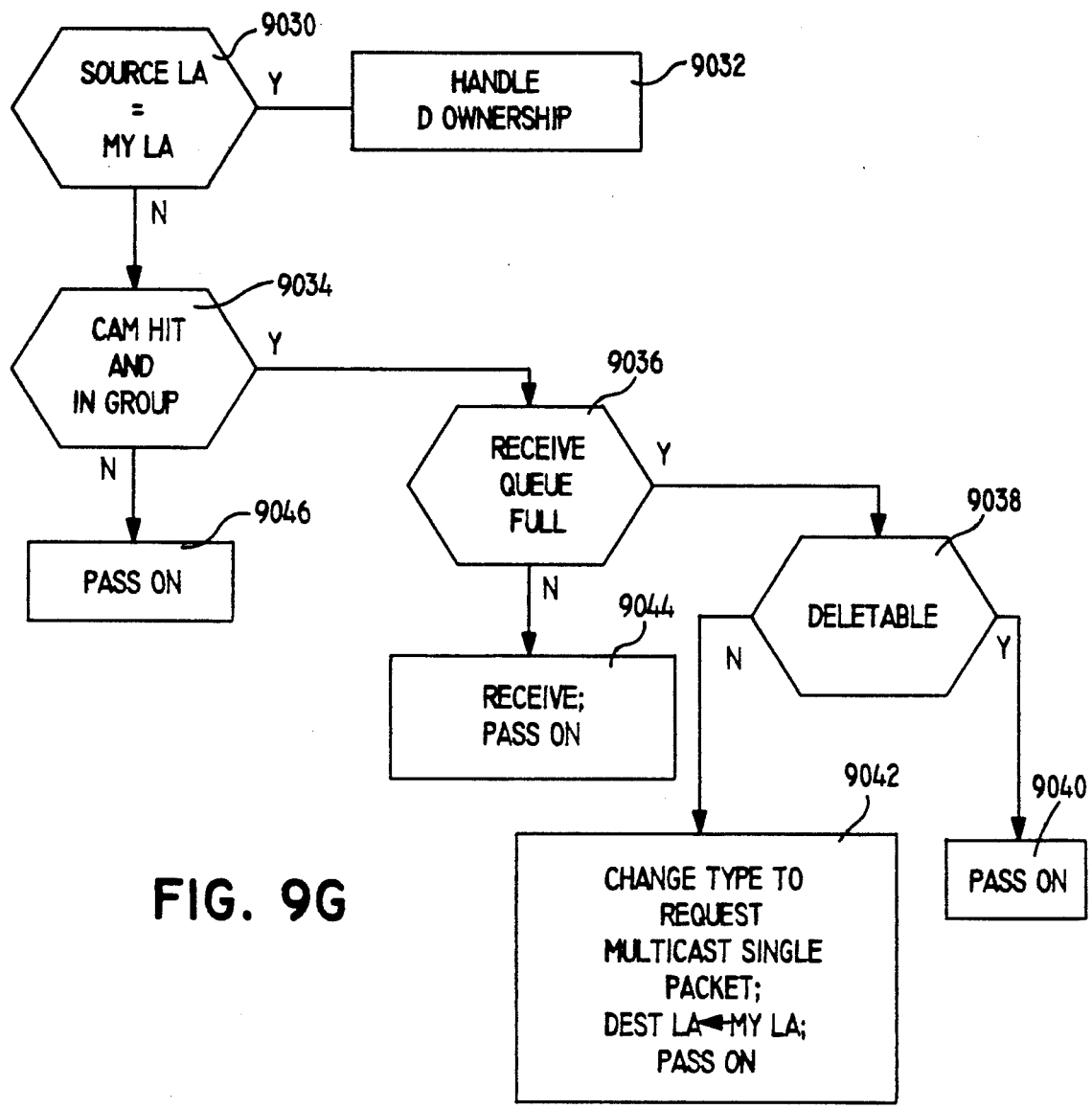

The flow-chart diagram in FIG. 9g illustrates the HANDLE MULTICAST SINGLE state machine, that is to say, the operation of the node when a MULTICAST SINGLE packet is received. When the SOURCE LA of the packet matches MY LA, at step 9030, then this node originally transmitted the multicast packet and all nodes in the multicast have received the packet. At step 9032, the state machine invokes the HANDLE D OWNERSHIP operation, as illustrated in FIG. 6b, to handle removal of the packet.

If the node was not the originator of the MULTICAST SINGLE packet at step 9030, the state machine determines if it is a member of the multicast group at step 9034. When the CAM 222 of the node has an entry for this group (CAM HIT) and the entry indicates that the node is a member of the group (IN GROUP), the state machine attempts to receive the packet for its host. Otherwise, at step 9046, the state machine retransmits the packet back onto the ring since this node is not a member of the multicast group.

If the node is to receive the MULTICAST SINGLE packet, at step 9034, the state machine checks the receive queue for space at step 9036. If the queue is not full, the state machine receives the packet and retransmits it back onto the ring at step 9044. Should the receive queue be full at step 9036, the state machine, at step 9038, determines if the packet is deletable. Deletable packets are either not critical, expendable or are time sensitive because they contain data which becomes obsolete very quickly. In this embodiment of the invention, deletable packets are simply passed back onto the ring if they cannot be received immediately by the host. Exemplary deletable packets may contain speech or video information. This type of information is sufficiently redundant that it is not significantly degraded by an occasional missing packet. At step 9040, the state machine retransmits the deletable packet without receiving it.

Any non-deletable packet received by the state machine, at step 9038, is changed to a REQUEST MULTICAST SINGLE packet at step 9042 and passed around the ring to wait for the receive queue of the node to have room for the packet.

Figure 9H:
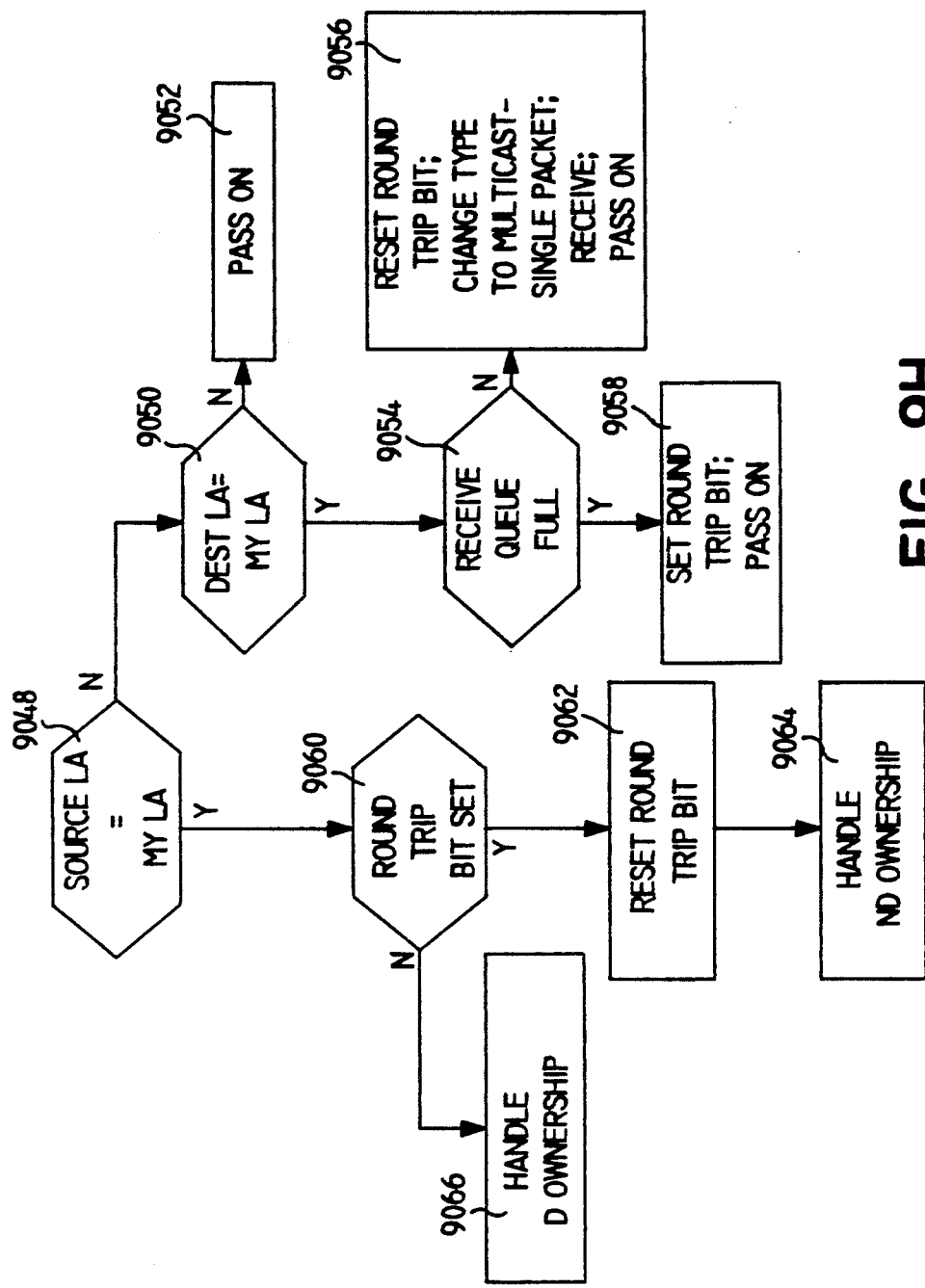
Figure 91:
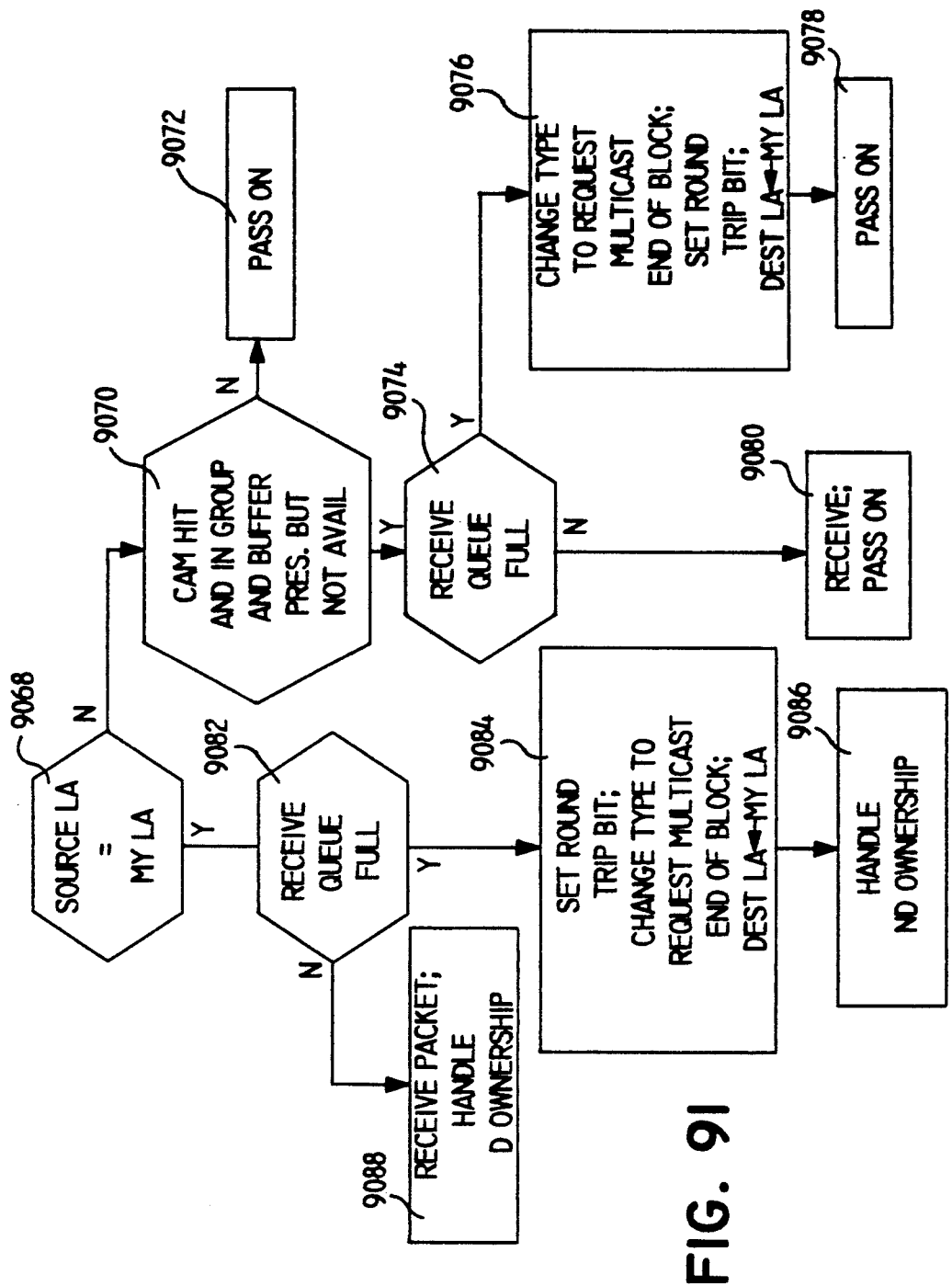

FIG. 9h diagrams the node operation when a REQUEST MULTICAST SINGLE packet is received from the ring. If the SOURCE LA matches MY LA, at step 9048, the node generated the original MULTICAST SINGLE packet. In this instance, the state machine checks the round trip bit (R). If the round-trip bit is set at step 9060, another node passed the packet to allow a delay until its host could receive the packet. Here, the state machine resets the round-trip bit (R), at step 9062, and invokes the HANDLE ND OWNERSHIP operation, at step 9064, to transmit the packet back onto the ring.

When the round-trip bit is not set at step 9060, the state machine is notified that the packet has seen by all nodes in the multicast group. The state machine, at step 9066, invokes the HANDLE D OWNERSHIP operation of FIG. 6b to handle removal of the packet.

If the SOURCE LA does not match MY LA at step 9048, the state machine, at step 9050, determines if this packet is to be received for the host. When DEST LA is MY LA, the node was to receive the packet earlier, but its receive queue was full. At step 9054, the state machine checks the receive queue. If the receive queue 10 is still full, the state machine, at step 9058, sets the round-trip bit and retransmits the packet around the ring.

Alternately, if the receive queue is no longer full, the state machine can receive the packet for the host. At step 9056, the state machine resets the round-trip bit (R), changes the packet back to a MULTICAST SINGLE packet, and both receives the packet for the host and transmits the packet back onto the ring.

FIG. 9i concerns the steps taken by a node when a MULTICAST END OF BLOCK packet is received. When the SOURCE LA is MY LA, the node sent the original MULTICAST END OF BLOCK packet. In this instance, the HANDLE MULTICAST END OF BLOCK state machine attempts to receive the packet to notify the host that all multicast nodes have received the packet. At step 9082, the state machine checks that the receive queue for the host is not full. If the queue is not full, the state machine sends the packet to the host by receiving the packet, and the state machine performs the HANDLE D OWNERSHIP operation at step 9088.

When the receive queue is full, at step 9082, the state machine allows time for space to become available in the queue by sending the packet back around the ring. Here, at step 9084, the state machine ensures that the packet will return by setting the round trip bit (R), changing the packet type to REQUEST MULTICAST END OF BLOCK and replacing DEST LA with MY LA. The state machine invokes the HANDLE ND OWNERSHIP operation at step 9086 to retransmit the packet onto the ring.

When the node did not originate the MULTICAST END OF BLOCK packet at step 9068, the state machine determines if it is included in the multicast group. If, at step 9070, the state machine has a CAM HIT which indicates that the node is IN GROUP, the packet is directed to this node. In this instance, the multicast buffer should have been reserved (BUFFER PRESENT but NOT AVAIL) by an earlier MULTICAST BUFFER LOCK packet. At step 9072, the state machine transmits the packet back onto the ring if any of the conditions of step 9070 are not met.

When the conditions of step 9070 are met, the state machine checks the receive queue, at step 9074, since the packet should be received by the host. If the receive queue is full, the state machine allows a delay for the host to make space available in the queue by sending the packet around the ring as a REQUEST MULTICAST END OF BLOCK packet. In this instance, at step 9076, the state machine, using the modify register 216, adjusts the packet to ensure that it will return. The state machine transmits the packet onto the ring at step 9078. If the packet can be received by the host at step 9074, the state machine at step 9080 receives the packet and passes it on the ring.

Figure 9J:
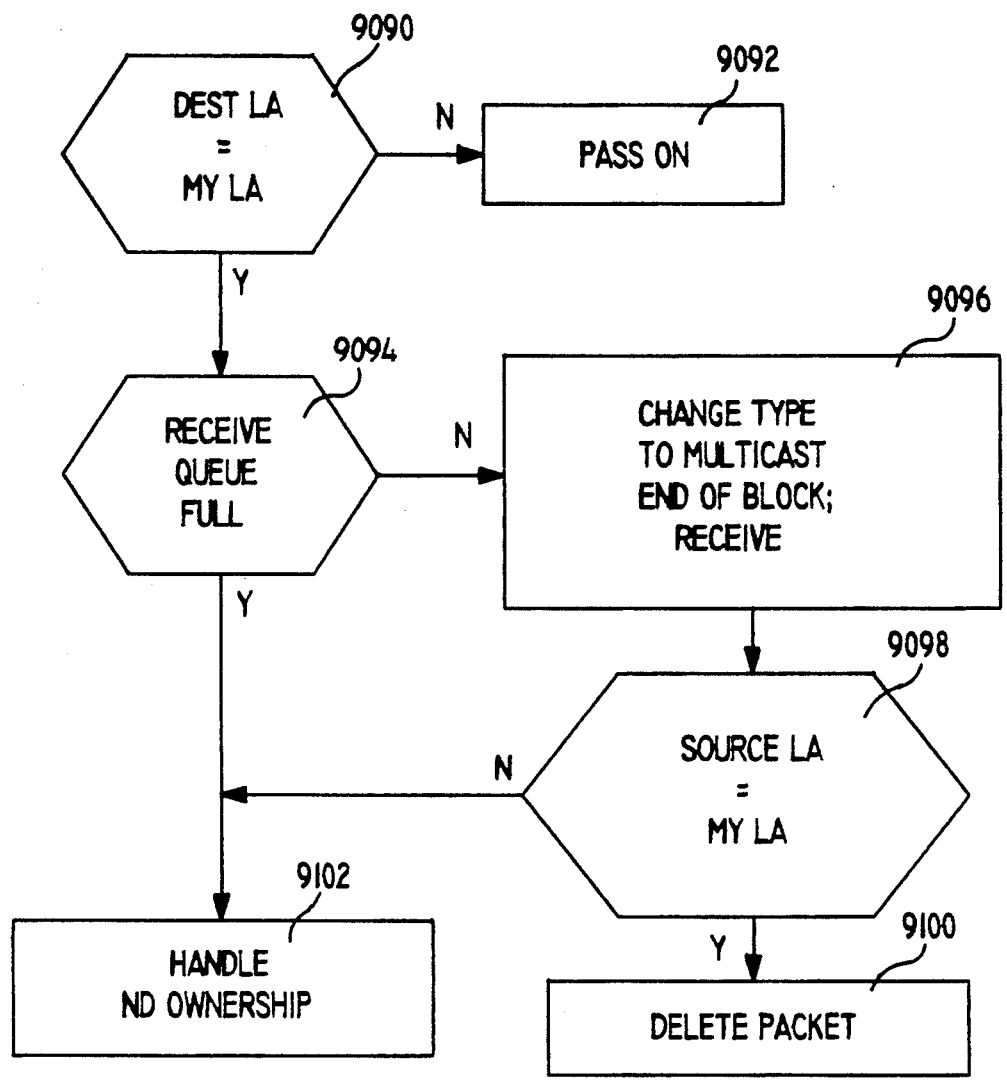

FIG. 9j illustrates the node operation when a REQUEST MULTICAST END OF BLOCK packet is received. If the destination loop address (DEST LA) is MY LA, the node sent this packet around the ring to delay receipt of the packet until the receive queue is no longer full. At step 9094, the HANDLE REQUEST MULTICAST END OF BLOCK state machine checks the receive queue status.

If the receive queue is not full, at step 9096, the state machine changes the packet type back to MULTICAST END OF BLOCK and receives the packet for the host. At step 9098, the state machine checks the SOURCE LA to determine if the packet should be removed or passed onto the ring. If, at step 9098, the SOURCE LA matches MY LA, the state machine, at step 9100, deletes the packet since this node sent the packet around the ring to wait for space in the receive queue.

When the SOURCE LA does not match MY LA at step 9098, the state machine retransmits the MULTICAST END OF BLOCK packet onto the ring to be received by the next node. The state machine transmits the packet back onto the network by performing the HANDLE ND OWNERSHIP operation as described above with reference to FIG. 6a.

If, at step 9094, the receive queue is still full, the state machine waits again for the receive queue to have room by sending the REQUEST MULTICAST END OF BLOCK packet around the ring. At step 9102, the state machine transmits the packet onto the network by performing the HANDLE ND OWNERSHIP operation.

While the invention has been described in terms of exemplary embodiments, it is contemplated that it may be practiced as outlined above within the spirit and scope of the appended claims.

The invention claimed is:

1. A network interface processor suitable for use in coupling a host processor to a packet switched data communications network which conveys packets having a type field, a source network address field and an identifier field, wherein the network interface processor has a unique address, the network interface processor comprising:
   means for receiving a packet from the network;
   memory means for holding a plurality of data values representing values which may be held in the identifier field of the packet;
   means for comparing the source address field of the received packet to the address of the network interface processor to generate a packet source control value;
   means for determining if the identifier field of the received packet matches one of the values held in the memory means to generate an in-memory control value; and
   packet forwarding means, responsive to the type field, to the packet source control value and to the in-memory control value, for conditionally changing the type field of the received packet and transmitting the packet onto the network.

2. A network interface processor according to claim 1, further comprising:
   means for receiving a message from the host processor containing a data value to be entered in the memory means; and
   means, responsive to the message, for entering the data value in the memory means.

3. A network interface processor according to claim 2, further comprising receive queue means, responsive to the type field, and to the packet source control value and the in-memory control value for conditionally sending the received packet to the host processor.

4. A network interface processor according to claim 3, wherein the network interface processor further comprises packet deleting means for conditionally removing the received packet from the network responsive to the packet source control value.

5. A network interface processor according to claim 4, wherein the message received from the host processor is a request to enter a multicast group identifier into the memory means and the data value identifies the multicast group.

6. A network interface processor according to claim 5, further comprising:
   means for determining if the receive queue means can receive a packet to generate a host receive control value;
   means for determining if, responsive to the in-memory control value, the network interface system is in the multicast group to receive the packet to generate an in-group control value;
   wherein the receive queue means includes means responsive to the type field, to the host receive control value and to the in-group control value for conditionally transmitting the received packet to the host processor.

7. A network interface processor according to claim 6, further comprising means for conditioning the packet forwarding means, responsive to the type field of the received packet, the host receive control value and the in-group control value, to conditionally transmit the received packet back onto the network.

8. A network interface processor according to claim 2, further comprising packet generation means, responsive to the message received from the host processor, for generating a packet containing the data value and for transmitting the generated packet onto the network.

9. A network interface processor according to claim 8, wherein:
   the message received from the host processor is a request to procure a lock and the data value identifies the lock; and
   the packet generation means inserts the unique address of the network interface processor into the address field and the data value identifying the lock into the identifier field of the generated packet.

10. A network interface processor according to claim 9, wherein the packet forwarding means changes the type field of the received packet and transmits the packet back onto the network if the packet source control value indicates that the address field of the packet matches the address of the network processor and the in-memory control value indicates that the value in the identifier field of the received packet exists in the memory means.

11. A network interface processor according to claim 8, wherein:
   the message received from the host processor is a request to send a multiple packet message to members of the multicast group and the data value identifies the group;
   the packet generation means, responsive to the multicast packet message request, inserts the group identifier into the identifier field and a buffer pre-allocation packet type value into the type field of the generated packet.

12. A network interface processor according to claim 11, wherein the value in the type field of the received packet includes the buffer pre-allocation packet type value, further comprising:
   means for determining, responsive to the packet source, in-memory and in-group control values, if the host processor has a buffer available for the multiple packet message to generate a buffer available control value; and
   means for allocating the buffer responsive to the buffer available control value;
   wherein the packet forwarding means is responsive to the buffer available control value for conditionally transmitting the received packet back onto the network.

13. A network interface processor according to claim 12, further comprising receive queue means responsive to the packet source control value, the in-memory control value, the in-group control value, the buffer available control value and the host receive control value for conditionally transmitting the received packet to the host.

14. A network interface processor according to claim 11, wherein the type field of the received packet includes the buffer pre-allocation packet type, further comprising receive queue means responsive to the packet source control value and the host receive control value for conditionally transmitting the received packet to the host.

15. A method of controlling congestion in a packet-switched communication system which includes a plurality of host computers, each coupled to a respective network interface processor, wherein the network interface processors are interconnected via a network and each network interface processor includes a receive buffer, the method comprising the steps of:
   receiving packets from the network at one of the network interface processors, which packets are addressed to the one network interface processor; 1 storing the received packets in the receive buffer;
   detecting when the receive buffer contains a number of packets greater than a predetermined high threshold value to produce a high status signal; and
   responsive to the high status signal, transmitting a stop packet onto the network to cause all of the other network interface processors to suspend transmission of packets addressed to the one network interface processor.

16. A method according to claim 15, further including the steps of:
   detecting when the receive buffer contains a number of packets less than a predetermined low threshold value, wherein the low threshold value is less than the high threshold value, to produce a low status signal; and
   responsive to the low status signal, transmitting a start packet onto the network to cause all of the other network interface processors to resume any pending packets addressed to the one network interface processor.

17. A method according to claim 16, wherein the network interface processor further includes a memory having a storage cell for each of the other ones of the network interface processors, the method further comprising the steps of:
   storing a first status value in the memory element associated with one of the other network interface processors responsive to receiving the stop packet transmitted by the one other network interface processor;
   storing a second status value in the memory element associated with the one other network interface processor responsive to receiving the start packet transmitted by the one other network interface processor; and
   checking the memory element associated with the one other network interface processor prior to sending a packet to the one other network interface processor and sending the packet only if the memory element contains the second status value.

18. A method of controlling congestion in a .. packet-switched data communications system which includes a plurality of host computers, each coupled to a respective network interface processor, wherein the network interface processors are interconnected via a network for transferring packets of data among the host computers, each network interface processor includes a transmit queue which holds packets to be transmitted onto the network, a transfer packet buffer which holds a single packet received from the network, that is to be transmitted onto the network and an auxiliary transfer packet buffer, and each packet has an owned packet field, the method comprising the steps of:
   a) detecting, at one of the network interface processors, that at least one of the transfer buffer and the transmit queue of the one network interface processor is full for a predefined amount of time to generate an ownership control value;
   b) conditionally storing a packet received from the network to in the auxiliary transfer buffer responsive to the ownership control value;
   c) responsive to the ownership control value, storing a value in the owned packet field of a next packet to be transmitted from the transmit queue to indicate that the packet is for exclusive use of the one network interface processor;
   d) responsive to the ownership control value, transmitting the next packet in the transmit queue onto the network.

19. A method of controlling congestion in a networked computer system according to claim 18, wherein the step a) includes the step of detecting that the transfer buffer is full and that the transmit queue is full for a predefined amount of time to produce the ownership control value.

20. A method according to claim 19, further including the steps of:
   deleting the packet from the network if the packet is no longer needed, responsive to the ownership control value, owned control value and packet source control value.

21. Apparatus which controls congestion in a packet-switched communication system that includes a plurality of host computers, each coupled to a respective network interface processor, wherein the network interface processors are interconnected via a network and each network interface processor includes a receive buffer, the apparatus comprising:
   means for receiving packets from the network at one of the network interface processors;
   means for storing received packets addressed to the one network interface processor in the receive buffer;
   means for detecting when the receive buffer contains a number of packets greater than a predetermined high threshold value to produce a high status signal; and
   means, responsive to the high status signal, for transmitting a stop packet onto the network to cause all of the other network interface processors to suspend transmitting pending packets addressed to the one network interface processor.

22. Apparatus according to claim 21, further comprising:
   means for detecting when the receive buffer contains a number of packets less than a predetermined low threshold value, wherein the low threshold value is less than the high threshold value, to produce a low status signal; and
   means, responsive to the low status signal, for transmitting a start packet onto the network to cause the other network interface processors to resume transmitting the pending packets addressed to the one network interface processor.

23. Apparatus according to claim 22 further comprising:
   a memory having a respective storage cell for each of the other ones of the network interface processors;
   means for storing a first status value in the memory element associated with the one network interface processor responsive to receiving a stop packet transmitted by the one network interface processor;
   means for storing a second status value in the memory element associated with the one network interface processor, responsive to receiving a start packet transmitted by the one network interface processor;
   means for checking the memory element for the one network interface processor prior to transmitting a data packet to the one network interface processor; and
   means for transmitting the data packet only if the memory element contains the second status value.

24. Apparatus which controls congestion in a packet-switched data communications system that includes a plurality of host computers, each coupled to a respective network interface processor, wherein the network interface processors are interconnected via a network for transferring packets of data among the host computers, each network interface processor includes a transmit queue which holds at least one packet to be transmitted onto the network and a transfer packet buffer which holds a single packet received from the network, that is to be transmitted onto the network, said apparatus being coupled to each network interface processor and comprising:
   an auxiliary transfer packet buffer for holding a further packet which is received from the network;
   means for detecting that the transfer buffer has not had available space sufficient to hold one packet for a predefined amount of time, to generate an ownership control value;
   means, responsive to the ownership control value, for conditionally storing a packet received from the network into the auxiliary transfer buffer;
   packet modifying means, responsive to the ownership control value, for modifying the packet in the transmit queue to indicate that the packet in the transmit queue is reserved for exclusive use of the network interface processor;
   packet transmission means, responsive to the ownership control value, for transmitting the modified packet onto the network.

25. Apparatus according to claim 24, wherein the means for detecting further includes means for detecting that the transfer buffer is full and that the transmit queue is full for a predefined amount of time to produce the ownership control value.

26. Apparatus according to claim 25, further including:
   means for detecting that the transfer buffer is less than full for a further predefined amount of time to change the ownership control value;
   means, responsive to the change in the ownership control value, for changing the value in the modified packet to indicate that the modified packet is no longer reserved for the exclusive use of the network interface processor.

* * * * *

UNITED STATES PATENT AND TRADEMARK OFFICE
CERTIFICATE OF CORRECTION

PATENT NO. : 5,243,596
DATED : September 7, 1993
INVENTOR(S) : Port et al.

It is certified that error appears in the above-indentified patent and that said Letters Patent is hereby corrected as shown below:

Column 30, line 28, claim 15, please delete "1".

Column 30, line 48, claim 16, insert --sending-- before the word "any".

Signed and Sealed this

Twenty-ninth Day of March, 1994

Attest:

BRUCE LEHMAN

Attesting Officer     Commissioner of Patents and Trademarks